United States Patent

Pettus

[11] Patent Number: 5,832,219
[45] Date of Patent: Nov. 3, 1998

[54] DISTRIBUTED OBJECT NETWORKING SERVICE

[75] Inventor: Christopher E. Pettus, San Francisco, Calif.

[73] Assignee: Object Technology Licensing Corp., Cupertino, Calif.

[21] Appl. No.: 575,262

[22] Filed: Dec. 20, 1995

Related U.S. Application Data

[63] Continuation of Ser. No. 193,325, Feb. 8, 1994, abandoned.

[51] Int. Cl.⁶ .................................................. G06F 13/00
[52] U.S. Cl. ............................. 395/200.33; 395/200.49; 395/200.57; 395/684
[58] Field of Search ................... 395/200.33, 200.49, 395/200.57, 684, 800, 700, 650, 200, 164, 161, 735, 600, 200.01

[56] References Cited

U.S. PATENT DOCUMENTS

| | | | |
|---|---|---|---|
| 4,821,220 | 4/1989 | Duisberg | 264/578 |
| 4,885,717 | 12/1989 | Beck et al. | 395/775 |
| 4,891,630 | 1/1990 | Friedman et al. | 340/706 |
| 4,953,080 | 8/1990 | Dysart et al. | 395/600 |
| 5,041,992 | 8/1991 | Cunningham et al. | 364/518 |
| 5,050,090 | 9/1991 | Golub et al. | 364/478 |
| 5,060,276 | 10/1991 | Morris et al. | 382/8 |
| 5,075,848 | 12/1991 | Lai et al. | 395/425 |
| 5,093,914 | 3/1992 | Coplien et al. | 395/700 |
| 5,119,475 | 6/1992 | Smith et al. | 395/156 |
| 5,125,091 | 6/1992 | Staas, Jr. et al. | 395/650 |
| 5,133,075 | 7/1992 | Risch | 395/800 |
| 5,136,705 | 8/1992 | Stubbs et al. | 395/575 |
| 5,151,987 | 9/1992 | Abraham et al. | 395/575 |
| 5,181,162 | 1/1993 | Smith et al. | 364/419 |
| 5,307,490 | 4/1994 | Davidson et al. | 395/650 |
| 5,325,524 | 6/1994 | Black et al. | 395/600 |
| 5,329,619 | 7/1994 | Page' et al. | 395/200.01 |
| 5,339,392 | 8/1994 | Risberg et al. | 395/161 |
| 5,341,478 | 8/1994 | Travis, Jr. et al. | 395/200 |
| 5,367,633 | 11/1994 | Matheny et al. | 395/164 |
| 5,404,529 | 4/1995 | Chernikoff et al. | 395/700 |
| 5,455,951 | 10/1995 | Bolton et al. | 395/700 |
| 5,455,953 | 10/1995 | Russell | 395/735 |
| 5,457,797 | 10/1995 | Butterworth et al. | 395/650 |
| 5,557,796 | 9/1996 | Fehskens et al. | 395/680 |

*Primary Examiner*—Alyssa H. Bowler
*Assistant Examiner*—John Follansber
*Attorney, Agent, or Firm*—Kudika and Jobse

[57] ABSTRACT

Remote procedure call (RPC) objects are provided in both a client node and a server node of a client-server network for invoking and responding to service requests generated by calls to local service objects. Specifically, the RPC objects comprise a "caller" object which, once instantiated, accepts service requests from client objects. A service request made by calling a function in the local service object is automatically routed by the caller object to a local service program if the requests can be serviced locally, or to a remote server node if the appropriate service program is located on the remote node. The RPC objects also include a "dispatcher" object which is located at the remote service node and receives incoming service requests. The service requests are actually satisfied by means of service functions which are part of service objects in the server node, but these latter service functions are associated with the local service objects by means of a "dictionary" located in the dispatcher object. In some cases, a service located at a remote node may itself need data or functions which, in turn, reside at other nodes. In this case, the dispatcher object is provided with additional "sub-objects" or "child" objects which include their own dispatcher objects. In this manner, incoming requests directed to the "parent" dispatcher object are forwarded to the child dispatcher objects for service.

16 Claims, 15 Drawing Sheets

| 1002 → | Hashed Class Name 1 | Request Table Offset 1  1008 | Max Request Count 1 | ← 1014 |
|---|---|---|---|---|
| 1004 → | Hashed Class Name 2 | Request Table Offset 2  1010 | Max Request Count 2 | ← 1016 |
| 1006 → | Hashed Class Name 3 | Request Table Offset 3  1012 | Max Request Count 3 | ← 1018 |
| 1000 → | | | | |

FIG. 10

| 1102 → | 01 | Remote Function Pointer | ← 1108 |
|---|---|---|---|
| 1104 → | 02 | Remote Function Pointer | ← 1110 |
| 1106 → | 01 | Remote Function Pointer | ← 1112 |
| 1100 → | | | |

FIG. 11

DISTRIBUTED OBJECT NETWORKING SERVICE

This is a continuation of application Ser. No. 08/193,325 filed on Feb. 8, 1994 now abandoned.

COPYRIGHT NOTIFICATION

Portions of this patent application contain materials that are subject to copyright protection. The copyright owner has no objection to the facsimile reproduction by anyone of the patent document, or the patent disclosure, as it appears in the Patent and Trademark Office. All other rights are expressly reserved.

FIELD OF THE INVENTION

This invention relates generally to improvements in distributed computer networks and, more specifically, to operating system software for efficiently implementing client-server systems in distributed service networks.

BACKGROUND OF THE INVENTION

Computer hardware is becoming increasingly distributed and remote, resulting in networks of computers for solving problems in concert rather than as stand-alone systems. Although such distributed "services" networks generally facilitate problem-solving, they also increase the need for flexibility and functionality in software programs operating on the computers.

An example of a distributed services computer network is a "client-server" system 100 shown in FIG. 1. The system 100 comprises a collection of client nodes 102, e.g., workstations or personal computers, that communicate over a network 104 with various server nodes 106. The servers are typically computers having hardware and software elements that provide a sophisticated set of services, or operations, for use by the client nodes 102 to increase the efficiency of their own operations.

Several types of networks, including local area networks (LANs), may be employed in the client-server system 100. A LAN is a limited area network that typically consists of a transmission medium, such as a coaxial cable or twisted pair, for interconnecting the client and server nodes. Each node is connected to the transmission medium at an address which uniquely identifies the node and which is used to route data from one node to another.

Nodes coupled to the network typically communicate by exchanging discrete "packets" of data according to predefined "protocols". In this context a protocol consists of a set of rules defining how the nodes interact with each other. For example, communication in the client-server system 100 typically takes the form of packet exchanges, wherein the clients 102 send requests to the servers 112, which perform their services and communicate results back to the clients.

In order to reduce design complexity, most networks are organized as a series of hardware and software levels or "layers" within each node. These layers interact to format data for transfer between nodes that are communicating over the network. Specifically, predetermined services are performed on the data as it passes through each layer and the layers communicate with each other by means of the predefined protocols. This layered design permits each layer to offer selected services to other layers using a standardized interface that shields those layers from the details of actual implementation of the services.

In an attempt to standardize network architectures, i.e., the sets of layers and protocols used within a network, a generalized model has been proposed by the International Standards Organization (ISO). The model, called the open systems interconnection (OSI) reference model, addresses the interconnection of systems that are "open" for communication with other systems. The proposed OSI model has seven layers which are termed, in ascending interfacing order, the "physical", "data link", "network", "transport", "session", "presentation" and "application" layers. These layers are arranged to form a protocol "stack" in each node of the network.

FIG. 2 illustrates a block schematic diagram of prior art protocol stacks 225 and 275 used to transmit data between a client node 200 and a server node 250, respectively. The protocol stacks are structured according to the international standards organization OSI seven-layer model, which also standardizes the functions of their constituent layers. Accordingly, only the protocol stack 225 of the client node will be described.

Broadly stated, the physical layer 214 of the OSI model transmits a raw data bit stream over a communication channel 220, while the data link layer 212 manipulates the bit stream and transforms it into a data stream that appears free of transmission errors. This latter task is accomplished by dividing the transmitted data into data frames and transmitting the frames sequentially, accompanied with error correcting mechanisms for detecting or correcting errors. The network layer 210 routes data packets from a source node to a destination node by selecting one of many alternative paths through the physical network. The transport layer 208 accepts the data stream from the session layer 206, apportions it into smaller units (if necessary), passes the smaller units to the network layer 212, and provides appropriate mechanisms to ensure that all the units arrive correctly at the destination.

The session layer 206 establishes "sessions", i.e., connections, between software processes on the source and destination nodes, and transfers data over those connections in an orderly fashion. That is, a session not only allows ordinary data transport between the nodes, but it also provides enhanced services in some applications, such as dialogue control. The presentation layer 204 performs frequently-requested functions relating to the presentation of transmitted data, including encoding of data into standard formats, while the application layer 202 contains a variety of protocols that are commonly needed by programs executing on the nodes, such as remote file access.

As can be seen in FIG. 2, the protocol stacks 225 and 275 are physically connected through the communications channel 220 at the physical layers 214 and 164. Thus, data transmission over a client-server network consists of generating data messages in the application layer 202 of the client node 200 and passing the data messages down through the protocol stack 225, where they are formatted for delivery onto the channel 220 as bits of packets. Those packet bits are transmitted to the protocol stack 275 of the server 250, where they are passed up that stack to the application layer 252. The generation and formation of data are performed by software programs executing on the nodes and, in some cases, hardware present on the nodes. The software programs may be generally categorized into two broad classes: application programs and operating systems. Operating systems are usually specific to a type of computer and consist of a collection of a utility procedures that enable the computer to perform basic operations, such as storing and retrieving information on primary and secondary storage devices, displaying information on an associated video display and, in some cases, performing network operations.

By itself, the operating system generally provides only very basic functions and must be accompanied by an "application" program. The application program interacts with the operating system to provide much higher level functionality and a direct interface with a user of the node. During interactions with the operating system, the application program typically invokes the utility procedures by issuing a series of parameter requests, via standard local procedure calls, to the operating system which then performs the request in accordance with the parameters. For example, the application program may "call" the operating system to store particular data on a computer disk memory or forward the data over the network.

As noted, a significant function of each layer in the OSI model is to provide services to the other layers. Two types of services offered by the layers are "connection-oriented" and "connectionless" network services. In a connection-oriented service, a source node establishes a connection with a destination node and, after sending a message, terminates the connection. The overhead associated with establishing the connection may be unattractive for nodes requiring efficient communication performance. For this latter case, a fully connectionless service is desirable where each transmitted packet carries the full address of its destination through the network.

A remote procedure call (RPC) establishes such a "connectionless session" between a client node and a server node for execution of a specific service. The RPC is typically embedded in software programs to make the remote call appear "local" to the nodes. Client-server communication thus takes the form of procedure calls and the network details are hidden from the application program by placing them in local procedures called "stub" procedures.

FIG. 3 illustrates a typical client-server system 300 wherein the client and server nodes are schematically represented by dotted boxes 305 and 355, respectively. Resident in each node are application programs, represented by boxes 302 and 352, and operating systems, represented by boxes 306 and 356. Interactions between the application programs and operating systems are illustrated schematically by the two-headed arrows 304 and 354. This dual program system is used on many types of computers ranging from mainframes to personal computers.

In order to provide RPC functions, the application programs interact (as shown schematically by arrows 308 and 318) with stub procedure software 310 and 360 by exchanging parameter requests. Each stub procedure, which is generally associated with the operating system, arranges, i.e., "flattens", the parameters into a predetermined message format according to the computer type. An RPC may transfer data or request a server to perform an operation; accordingly, appropriate stub procedures must be specifically designed in each node to invoke, or respond to, such actions.

Transport entities 314 and 364, i.e., the software within the transport layers of the protocol stacks, interact with the stub procedures (as shown schematically by arrows 312 and 362) to receive the messages, format them into packets and pass them over the network channel 315 via network adapters 316 and 366. These adapters incorporate the signal, electrical and mechanical characteristics, and interchange circuits, needed to interface with the network channel 315. The transport entities generally provide reliable, cost-effective data transport between the client and server, independent of the physical network channel.

To implement an RPC system, the application program 302 of the client 305 calls the stub procedure 310 in a well-known way, passing parameters in a manner similar to passing parameters for a conventional procedure call. The client stub procedure 310 flattens the parameters, which are passed to the transport entity 314 for transmission to the server 355 as a data packet. Since the RPC is a connectionless system, the transport entity typically attaches a header to the packet prior to forwarding it to the adapter 316 and onto the channel. When the packet arrives at the server, the adapter 366 passes it to transport entity 364 and onto the server stub procedure 360, which unflattens the parameters. The stub procedure 360 then calls the application program 352 and passes the parameters in a conventional manner.

After completing its work, the application program 352 "returns" in a manner that is conventional for local procedure calls, e.g., by returning a result. The stub procedure 360 flattens the result into a message and passes it to the transport entity 364, where a reply packet is formed and transferred to the client 305 over the channel 315. Upon receiving the reply packet, the transport entity 314 passes it to the client stub procedure 310 for unflattening. Finally, the stub procedure returns the reply parameters to the application program 302.

Clearly, the RPC system is a significant vehicle for providing distributed services in a client-server system. Accordingly, it would be advantageous to be able to use an RPC-like system with application programs and operating systems which use "Object-Oriented Programming (OOP) techniques. As will be understood by those skilled in the art, OOP techniques involve the definition, creation, use and destruction of "objects". These objects are software entities comprising data elements and routines, or functions, which manipulate the data elements. The data and related functions are treated by the software as an entity that can be created, used and deleted as if it were a single item. Together, the data and functions enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

When OOP techniques are used in a client-server system, it is convenient for an application which utilizes objects which, in turn, include functions, to be able to utilize those functions as if they were local functions even though the functions may actually be implemented as part of an object that resides in a remote server. In particular, the functions should be implemented in a "connectionless" manner so that their operation is transparent to the operation of the local object. An example of such function calls are "requests" which are made by objects in client application programs to service objects in order to cause the service objects to perform a desired service. In a distributed services network, the service objects may be local to the client node or located on a remote server node. In either case, it is desirable that access to the service take the same form.

Accordingly, it would be convenient if a local service object could satisfy service requests and use remote data simply by invoking a local request function in a local object or attempting to utilize data in a local object. When a request was made to the local function, the request would be forwarded over the client-server network and the result returned in a manner which was transparent to the user. The local request would also be able to use data which was resident on another node as if the data were local. In this manner, the service objects could be "distributed" over the network and yet perform as if they were all local objects.

Therefore, it is an object of the present invention to provide a flexible interface for efficiently implementing reliable client-server system communication in distributed service networks.

It is another object of the present invention to provide an interface for implementing client-server system communication in a manner which is compatible with OOP techniques.

It is another object of the present invention to provide a transparent mechanism by which service requests generated by a local client object can be satisfied either by local or remote service objects.

SUMMARY OF THE INVENTION

The foregoing objects are achieved in one illustrative embodiment of the invention in which remote procedure call (RPC) objects are provided in both the client node and the server node for invoking and responding to service requests generated by client objects. Specifically, the RPC objects comprise a "caller" object which, once instantiated, accepts service requests from client objects. If the requests can be serviced locally, then the caller object routes the request to a local service object. Alternatively, if the request is for a service which must be provided by a service object located on a remote server node, then the caller object provides high-level, "client-server communication" protocol requests to the remote node.

The RPC objects also include a "dispatcher" object which is located at the remote service node and receives the incoming service requests. The service requests are actually satisfied by means of service functions which are part of service objects in the server node, but these latter service functions are associated with the client objects by means of a "dictionary" located in the dispatcher object. In particular, the dispatcher dictionary associates pointers to the service functions with the class used to create the client objects. Therefore, service request made on client objects are transmitted over the network along with the client object class and result in a call to a function which is part of a remote object.

In some cases, a service located at a remote node may itself need data or functions which, in turn, reside at other nodes. In this case, the dispatcher object is provided with additional "sub-objects" or "child" objects which include their own dispatcher objects. In this manner, incoming requests directed to the "parent" dispatcher object are forwarded to the child dispatcher objects for service.

BRIEF DESCRIPTION OF THE DRAWINGS

The above and further advantages of the invention may be better understood by referring to the following description in conjunction with the accompanying drawings, in which:

FIG. 10 is a schematic block diagram of a portion of the dictionary table illustrating the structure of the dictionary entries;

FIG. 11 is a schematic block diagram of a portion of the request table illustrating the structure of the request entries;

DETAILED DESCRIPTION OF THE ILLUSTRATIVE EMBODIMENTS

Figure 1:
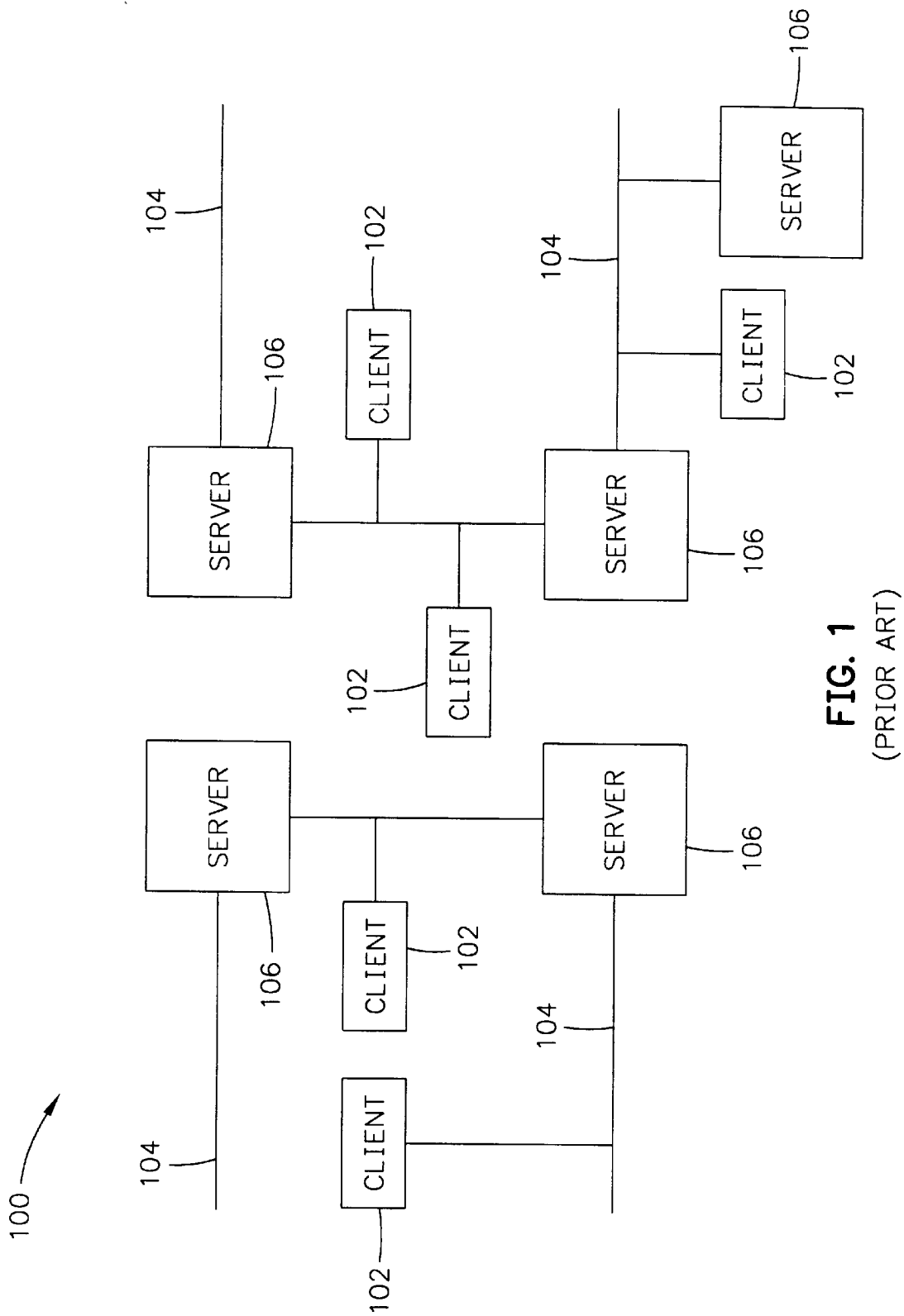
FIG. 1 is a block diagram of a computer network including a collection of nodes interconnected in a client-server system.
Figure 2:
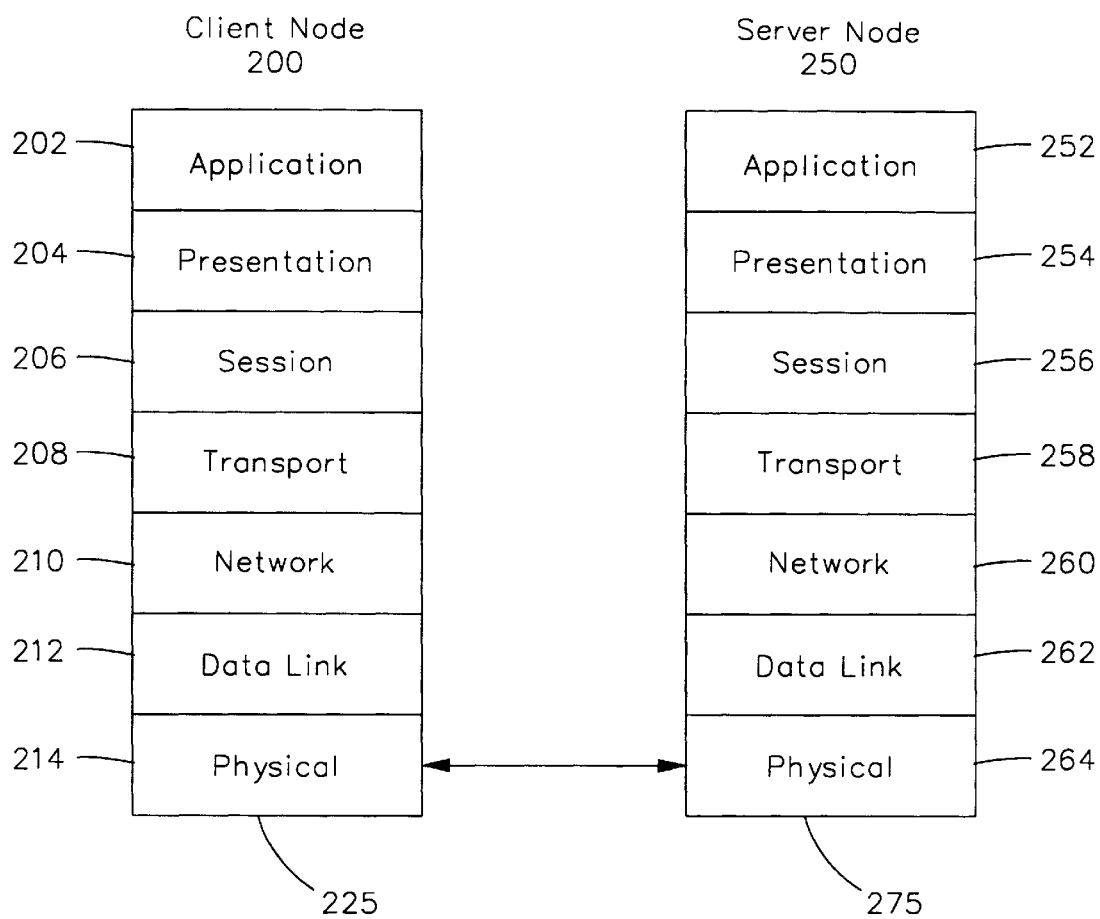
FIG. 2 is a schematic block diagram of prior art protocol stacks structured according to the international standards organization OSI seven-layer model and used to transmit data between a client node and a server node of the system shown in FIG. 1.
Figure 3:
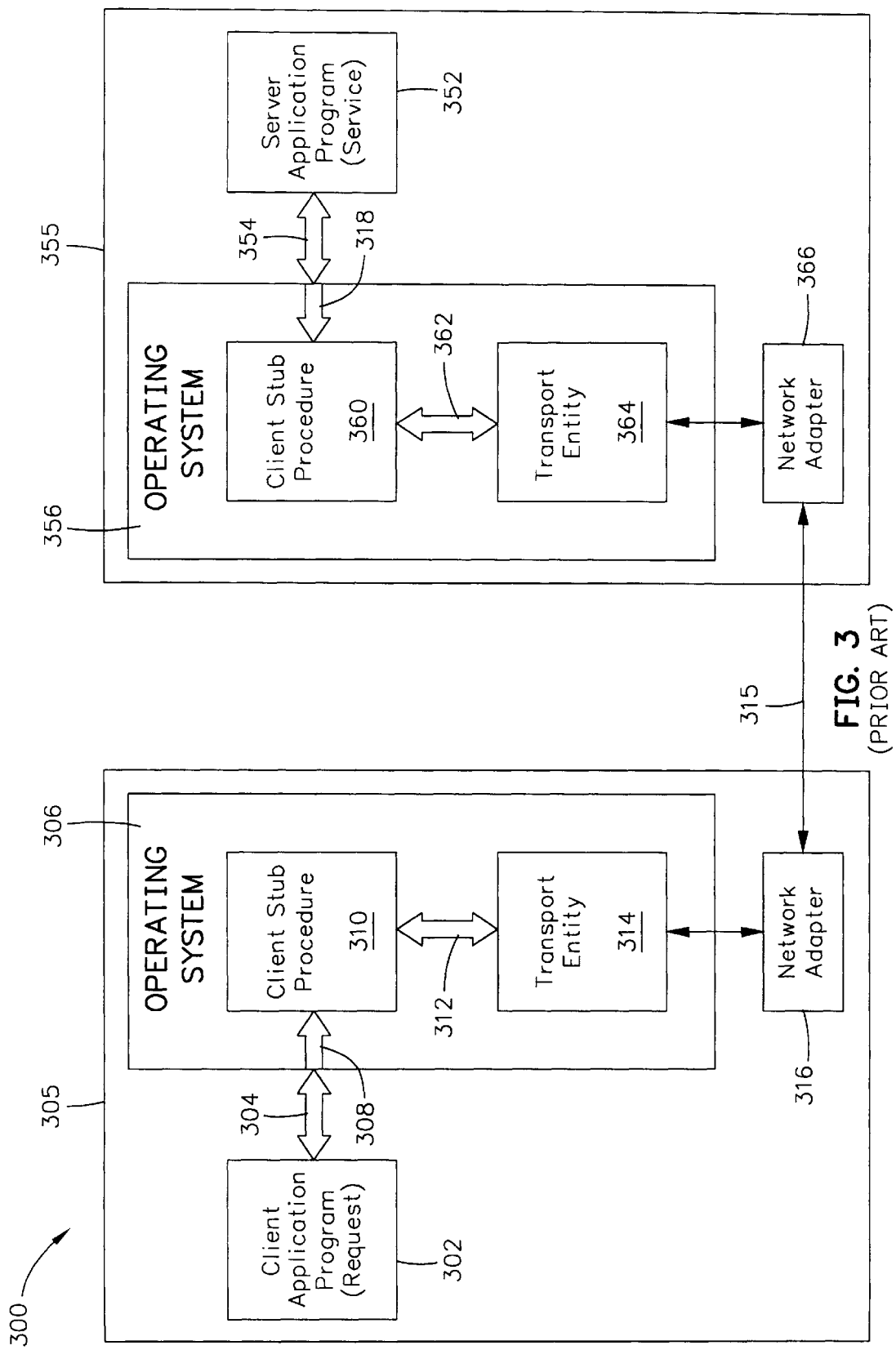
FIG. 3 is a schematic illustration of a typical client-server system showing the relationship between an operating system, an application program, a stub procedure and transport layer software of the prior art protocol stack for implementing a remote procedure call between the client and server nodes.
Figure 4:
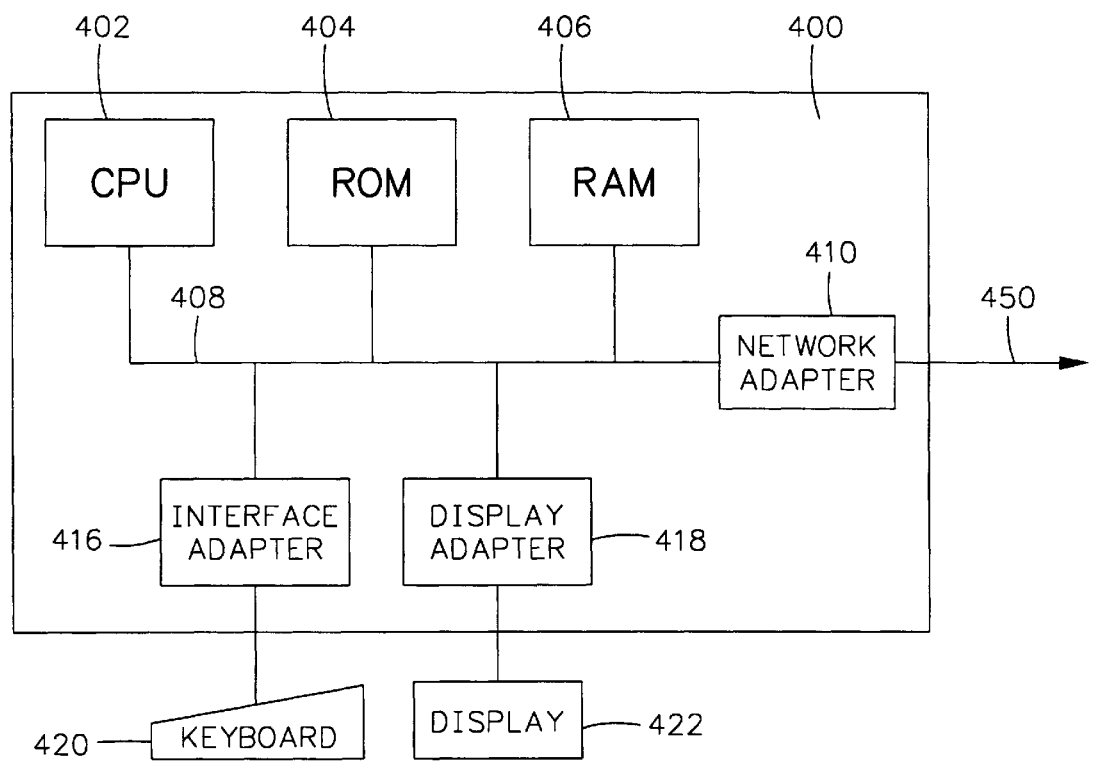
FIG. 4 is a schematic block diagram of a client node on which a caller RPC object may be instantiated.

FIG. 4 illustrates a typical hardware configuration of a client node 400 in accordance with the present invention. The client 400 is controlled by a central processing unit 402 (which may be a conventional microprocessor) and a number of other units, all interconnected via a system bus 408, are provided to accomplish specific tasks. Although a particular client computer may only have some of the units illustrated in FIG. 4 or may have additional components not shown, most clients will include at least the units shown.

Specifically, client 400 includes a random access memory (RAM) 406 for temporary storage of information, a read only memory (ROM) 404 for permanent storage of the computer's configuration and basic operating commands and a network adapter 410 for connecting the client to a transmission channel 450. A user interface adapter 416 is also provided for connecting input devices, such as a keyboard 420, and other known interface devices including mice, speakers and microphones to the bus 408. Visual output is provided by a display adapter 418 which connects the bus 408 to a display device 422 such as a video monitor.

Figure 5:
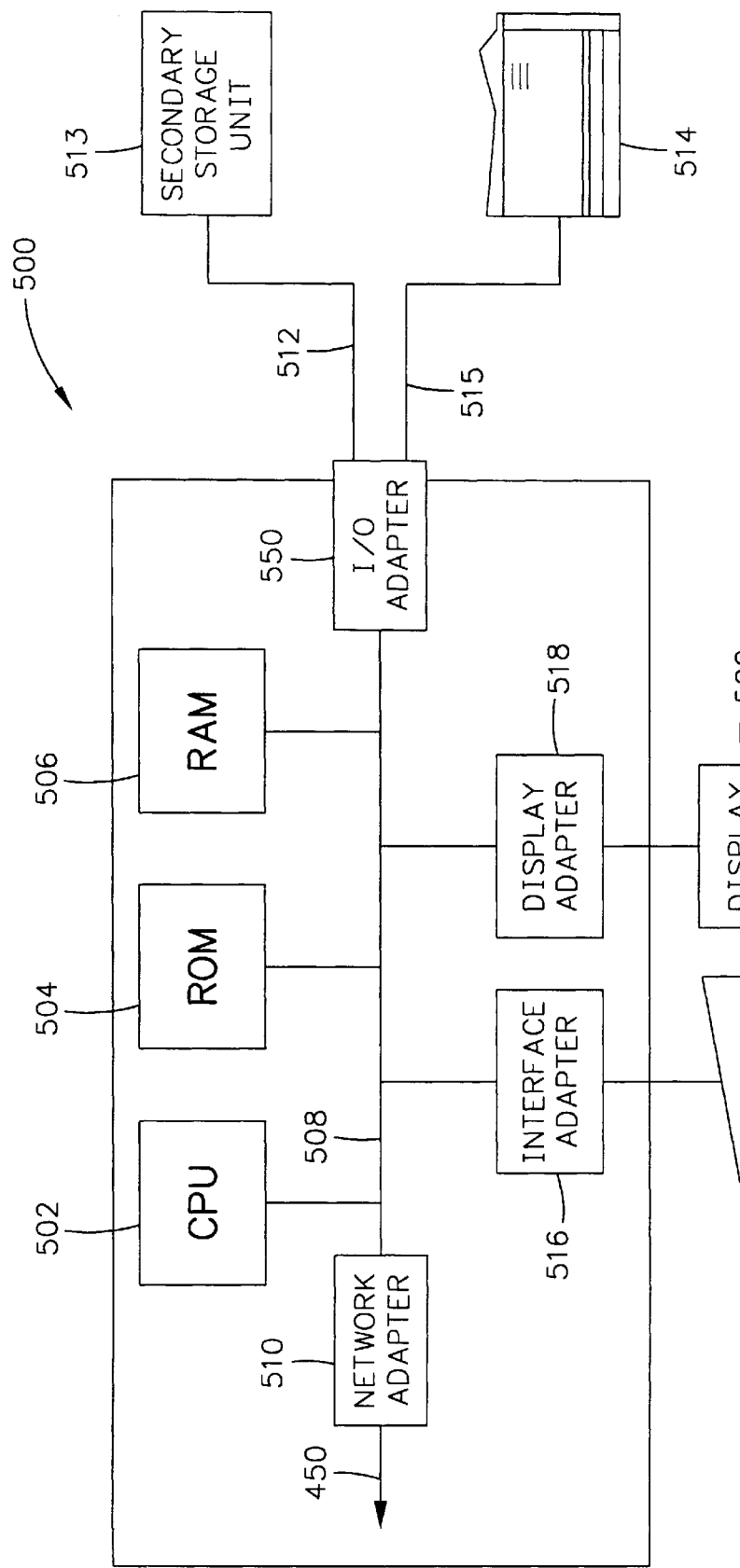
FIG. 5 is a schematic block diagram of a server node on which a dispatcher object may be instantiated.

FIG. 5 illustrates a typical hardware configuration of a server node 500 in accordance with the present invention. The server 500 has many of the same units as employed in the client 400, including a CPU 502, a ROM 504, a RAM 506, a network adapter 510, an interface adapter 516 and a display adapter 518, each of which are interconnected by a system bus 508. In addition, the server typically includes an input/output (I/O) adapter 550 for connecting peripheral devices such as a secondary storage unit 513 and a printer 514 to the bus 508, via cables 512 and 515, respectively.

The invention is preferably practiced in the context of client and server nodes such as IBM® PS/2 or Apple Macintosh computers. Moreover, the client and server have resident thereon, and are controlled and coordinated by, operating system software such as the Apple System/7 operating system. In a preferred embodiment, the invention is implemented in the C++ programming language using object-oriented programming techniques. C++ is a compiled language, that is, programs are written in a human-readable script and this script is then provided to another program, called a compiler, which generates a machine-readable numeric code that can be loaded into, and directly executed by, a computer. As described below, the C++ language has certain characteristics which allow a software developer to easily use programs written by others while still providing a great deal of control over the reuse of programs to prevent their destruction or improper use. The C++ language is well-known and many articles and texts are available which describe the language in detail. In addition, C++ compilers are commercially available from several vendors including Borland International, Inc. and Microsoft Corporation. Accordingly, for reasons of clarity, the details of the C++ language and the operation of the C++ compiler will not be discussed further in detail herein.

As previously mentioned Object-Oriented Programming (OOP) techniques involve the definition, creation, use and destruction of "objects". Objects are defined by creating "classes" which are not objects themselves, but which act as templates that instruct the compiler how to construct an actual object. A class may, for example, specify the number and type of data variables and the steps involved in the functions which manipulate the data. An object is actually created in the program by means of a special function called a "constructor" which uses the corresponding class definition and additional information, such as arguments provided during object creation, to construct the object. Likewise objects are destroyed by a special function called a "destructor". Objects may be used by manipulating their data and invoking their functions.

The principle benefits of object-oriented programming techniques arise out of three basic principles; encapsulation, polymorphism and inheritance. More specifically, objects can be designed to hide, or encapsulate, all, or a portion of, the internal data structure and the internal functions. More particularly, during program design, a program developer can define objects in which all or some of the data variables and all or some of the related functions are considered "private" or for use only by the object itself. Other data or functions can be declared "public" or available for use by other programs. Access to the private variables by other programs can be controlled by defining public functions for an object which access the object's private data. The public functions form a controlled and consistent interface between the private data and the "outside" world. Any attempt to write program code which directly accesses the private variables causes the compiler to generate an error during program compilation which error stops the compilation process and prevents the program from being run.

Polymorphism is a concept which allows objects and functions which have the same overall format, but which work with different data, to function differently in order to produce consistent results. For example, an addition function may be defined as variable A plus variable B (A+B) and this same format can be used whether the A and B are numbers, characters or dollars and cents. However, the actual program code which performs the addition may differ widely depending on the type of variables that comprise A and B. Polymorphism allows three separate function definitions to be written, one for each type of variable (numbers, characters and dollars). After the functions have been defined, a program can later refer to the addition function by its common format (A+B) and, during compilation, the C++ compiler will determine which of the three functions is actually being used by examining the variable types. The compiler will then substitute the proper function code. Polymorphism allows similar functions which produce analogous results to be "grouped" in the program source code to produce a more logical and clear program flow.

The third principle which underlies object-oriented programming is inheritance, which allows program developers to easily reuse pre-existing programs and to avoid creating software from scratch. The principle of inheritance allows a software developer to declare classes (and the objects which are later created from them) as related. Specifically, classes may be designated as subclasses of other base classes. A subclass "inherits" and has access to all of the public functions of its base classes just as if these function appeared in the subclass. Alternatively, a subclass can override some or all of its inherited functions or may modify some or all of its inherited functions merely by defining a new function with the same form (overriding or modification does not alter the function in the base class, but merely modifies the use of the function in the subclass). The creation of a new subclass which has some of the functionality (with selective modification) of another class allows software developers to easily customize existing code to meet their particular needs.

Although object-oriented programming offers significant improvements over other programming concepts, program development still requires significant outlays of time and effort, especially if no pre-existing software programs are available for modification. Consequently, a prior art approach has been to provide a program developer with a set of pre-defined, interconnected classes which create a set of objects and additional miscellaneous routines that are all directed to performing commonly-encountered tasks in a particular environment. Such pre-defined classes and libraries are typically called "application frameworks" and essentially provide a pre-fabricated structure for a working application.

For example, an application framework for a user interface might provide a set of pre-defined graphic interface objects which create windows, scroll bars, menus, etc. and provide the support and "default" behavior for these graphic interface objects. Since application frameworks are based on object-oriented techniques, the pre-defined classes can be used as base classes and the built-in default behavior can be inherited by developer-defined subclasses and either modified or overridden to allow developers to extend the framework and create customized solutions in a particular area of expertise. This object-oriented approach provides a major advantage over traditional programming since the programmer is not changing the original program, but rather extending the capabilities of the original program. In addition, developers are not blindly working through layers of code because the framework provides architectural guidance and modeling and, at the same time, frees the developers to supply specific actions unique to the problem domain.

There are many kinds of application frameworks available, depending on the level of the system involved and the kind of problem to be solved. The types of frameworks range from high-level application frameworks that assist in developing a user interface, to lower-level frameworks that provide basic system software services such as communications, printing, file systems support, graphics, etc. Commercial examples of application frameworks include MacApp (Apple), Bedrock (Symantec), OWL (Borland), NeXT Step App Kit (NeXT), and Smalltalk-80 MVC (ParcPlace).

While the application framework approach utilizes all the principles of encapsulation, polymorphism, and inheritance in the object layer, and is a substantial improvement over other programming techniques, there are difficulties which arise. These difficulties are caused by the fact that it is easy for developers to reuse their own objects, but it is difficult for the developers to use objects generated by other programs. Further, application frameworks generally consist of one or more object "layers" on top of a monolithic operating system and even with the flexibility of the object layer, it is still often necessary to directly interact with the underlying operating system by means of awkward procedural calls.

In the same way that an application framework provides the developer with prefab functionality for an application program, a system framework, such as that included in a preferred embodiment, can provide a prefab functionality for system level services which developers can modify or override to create customized solutions, thereby avoiding the awkward procedural calls necessary with the prior art application frameworks programs. For example, consider automated remote procedure call (RPC) facilities and transport entities to transfer service requests between client and server nodes. An application software developer who needed these capabilities would ordinarily have to write specific routines to provide them. To do this with a framework, the developer only needs to supply the characteristics and behavior of the finished output, while the framework provides the actual routines which perform the tasks.

A preferred embodiment takes the concept of frameworks and applies it throughout the entire system, including the application and the operating system. For the commercial or corporate developer, systems integrator, or OEM, this means all of the advantages that have been illustrated for a framework, such as MacApp, can be leveraged not only at the application level for such things as text and user interfaces, but also at the system level, for services such as printing, graphics, multi-media, file systems, I/O, and, as described herein, networking.

Figure 6:
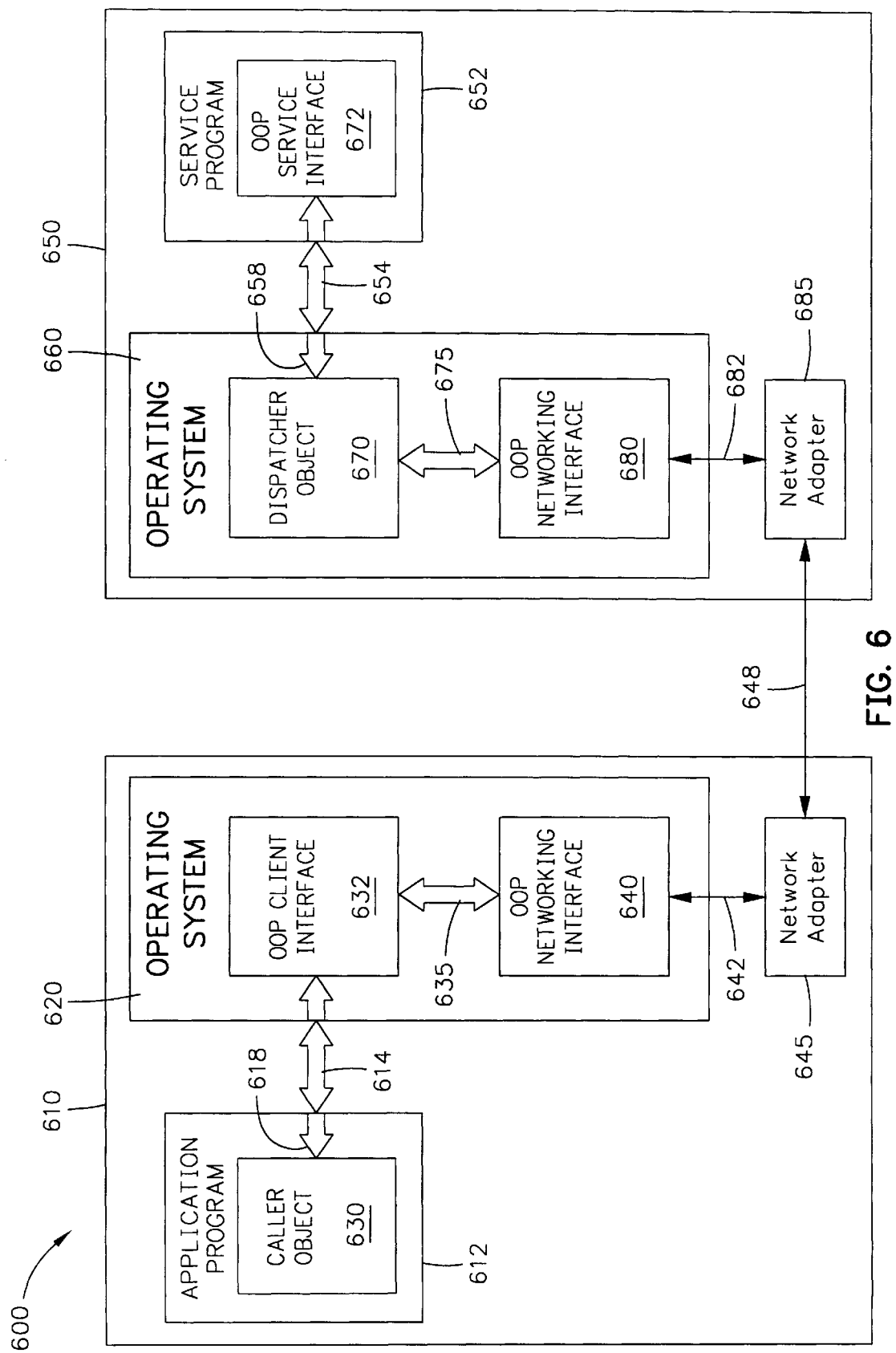
FIG. 6 is a schematic block diagram of client-server system in which the client and server nodes incorporate object-oriented client interfaces and networking interfaces.

In an object-oriented system, the RPC functions are performed by means of objects which are instantiated by both the client application program in a client node and the service program in a server node. FIG. 6 is a schematic block diagram of a client-server system 600 in which the client node 610 and server node 650 incorporate object-oriented RPC interfaces and networking interfaces. These interfaces are accessed by the client application program and the service program when invoking, transporting and responding to RPC service requests at the client and server nodes.

Referring first to the client node 610, a client application program 612 and an operating system 620 control and coordinate the operations of the node 610. Communication between the application program and operating system is indicated by arrow 614. However, instead of communicating directly with a stub procedure, application program 612 communicates with the operating system 620 at a higher level when requesting an RPC service. This latter interaction, shown schematically by dotted arrow 618, is accomplished by providing an RPC interface object called a "caller" object 630. A corresponding interface object 632 is primarily incorporated within the operating system 620; however, a portion of that interface is also created in the application program 612 when invoking RPC service requests and establishing a transport mechanism for communication with server node 650.

The service requests are transferred from the caller object 630 to the interface object 632 and thence to an object-oriented networking interface 640 as indicated schematically by arrow 635. As will also be described in more detail herein, the networking interface formats the requests and otherwise completes the transport path between the client node 610 and server node 650. Thereafter, the requests are forwarded to network adapter 645, as indicated by arrow 642, and over communication channel 648 to the server node 650.

At the server 650, the remote RPC request is received at the network adapter 685 and passed to the networking interface 680, as indicated by arrow 682. The networking interface 680 reformats the request and forwards it to a dispatcher object 670, as indicated by arrow 675. In response to the RPC, the dispatcher object 670 directs the request to an application program 652 for execution of the service.

As with the client node 610, the service program 652 communicates directly with operating system 660 of the server node 650, as indicated by arrow 654. A portion of the service application interface 672 resides in the service program 652 and interactions between the dispatcher object 670 and the interface object 672 are shown schematically by dotted arrow 658.

Figure 7:
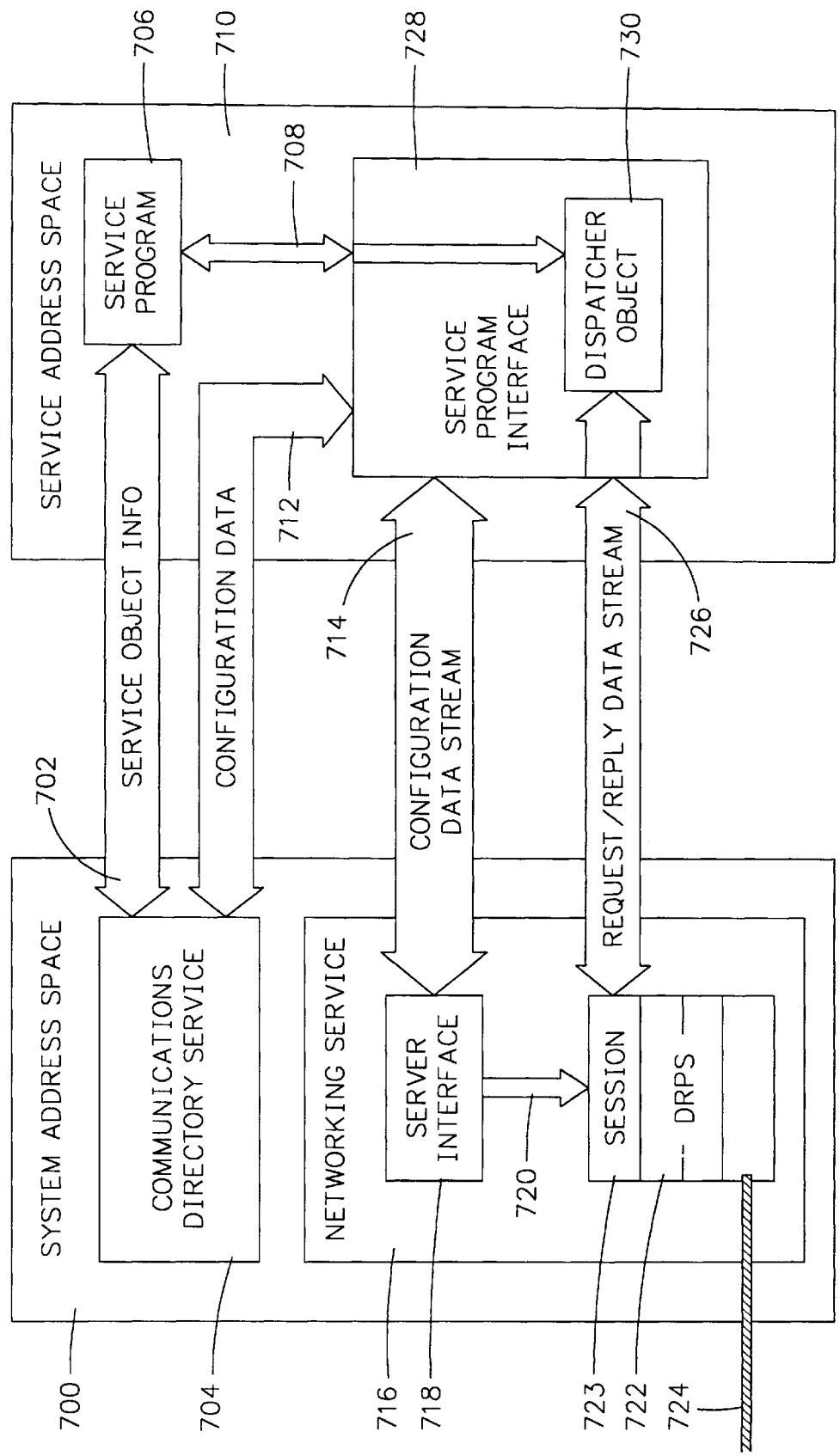
FIG. 7 is a schematic block diagram depicting a portion of a server node in a client-server network system and illustrating the main components and software routines which are utilized to register and activate a new service on the server node and then use the network to provide access to the new service.
Figure 8:
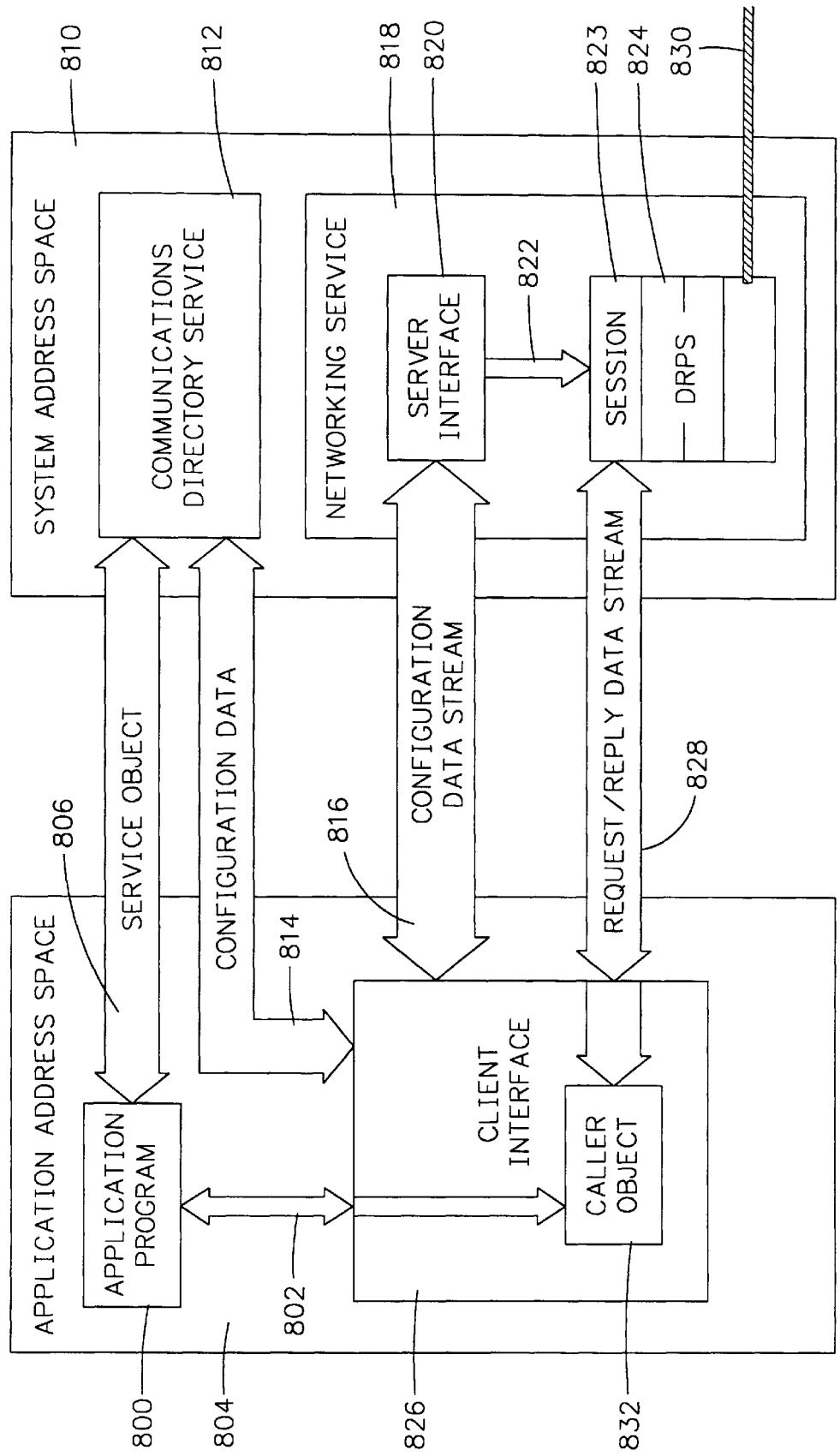
FIG. 8 is a schematic block diagram depicting a portion of a client node in a client-server network system and illustrating the main components and software routines which are utilized to access a service on the server node.

FIGS. 7 and 8 describe in more detail the operations performed by an illustrative service program operating in a server node in order to make a new service available on the network for use by application programs running in the client nodes. FIG. 7 is a schematic block diagram of the portions of the server node programs that are involved in the creation and activation of a new service. FIG. 8 is an illustrative flow chart which describes the interaction between the service program, a communications directory service and the node networking services in order to establish the new service and to configure the networking service to operate over an appropriate communication link.

More particularly, FIG. 7 illustrates the basic configuration of a server node in providing a service to a remote client. The server node is arranged with a common area, or system address space, 700 which address space would include operating system programs and various shared libraries that are used by the service applications running on the system. In particular, the system address space 700 includes a communications directory service 704 and the networking service programs and libraries 716. The communications directory service is used to assist users in locating and accessing network resources and comprises a network directory or naming service which accepts a resource identifier or name from a user and locates the network address that corresponds to the desired network resource.

Also in the server node is the service program 706 which runs in its own address space 710. There may actually be several service programs running in the server node (each in its own address space), but only program 706 is shown for clarity. Communications directory service 704 is also designed to store network configuration information along with the network address information which is commonly stored in such directory services. As will be hereinafter explained, the service program 706 interacts with the communications directory service 704 to create a service object which then resides in the communications directory service 704. This service object is distributed to all of the other nodes in this system and, thus, is available on a local basis to all of the clients on the network. The service object includes appropriate stack definitions for configuring the networking service 716 so that a client application program, together with the communications directory service, can set up a communications path to the service program using the previously stored definitions without involving a client application program in the path construction details.

More specifically, during the creation of a new service, the developer of the service program creates a new service object containing configuration parameters which are appropriate to the new service by subclassing service object classes which are predefined and located in the communications directory service 704. In accordance with normal object-oriented programming language operation, this subclassing information is included in the service program code during compilation.

Therefore, when the service program 706 is installed in the service program address space 710 in the appropriate server node, the constructor of the service object subclass can be called to construct a service object in the communications directory service 704. During the process of calling the constructor, the type and quality of service information is passed to the communications directory service as schematically indicated by arrow 702

As previously mentioned, the communications directory service 704 includes a set of stack definitions in shared libraries. These stacks definitions are created when the communications links are defined and are associated with a particular transport mechanism. The stack definitions each consist of a set of layer definitions. The layer definitions control the processing of the data in each layer and the interactions between layers. Each stack definition completely defines the stack from the transport layer through the physical layer (these layers are described above).

In order to complete the addition of a new service, the service object is activated when the service program 706 instructs the communications directory service 704 to send the stored service object to a dynamically reconfigurable protocol stack (DRPS) 722 in networking service 716. In order to convey the service object to the networking service, the service program 706 first creates a service program interface 728 in its own address space 710. The communication between the service program 706 and the service program interface 728 is schematically indicated by arrow 708. The service program interface 728, in turn, creates a configuration data stream 714 which can stream data to a server interface 718 which is permanently available and located in the networking service 716.

The service program 706 then retrieves the service object including the network configuration data. The configuration data passes from the communications directory service 704 to the service program interface 728 as indicated by arrow 712. The configuration data is then streamed to the system address space 700 as indicated by arrow 714 and the service exchange address is returned to the communications directory service 704.

A separate data stream is also set up by the service program at this time so that, at a subsequent time, when a client node requests service from the server node, the incoming service requests can be received and directed to a method in an appropriate service program which can satisfy the request. In order to set up this data stream, the new service is registered (as described in detail below) with the dispatcher object 730. The dispatcher object 730 is created when the server node is initialized and, as will hereinafter be explained in detail, contains a table of remote function pointers. An incoming request is associated with one of the function pointers which is then used to call the associated function.

In particular, service request data arriving over the physical communication link 724 is passed through the previously-configured DRPS 722 via a separate request data stream 726 which links the session layer 723 to the dispatcher object 730 in the service program interface 728. The dispatcher object 730, in turn, forwards the request, via data stream 708, to the service program 706. Reply information is returned by service program 706, via data stream 708, dispatcher object 730, request data stream 726, DRPS 722, and physical communication link 724 to the client node.

After a new service has been added to the local communication directory service, the copies on the other nodes must be updated. This updating is carried out in a conventional fashion. For example, it is possible to periodically distribute copies on removable disks to all nodes. However, a more preferred method of distributing copies of the communications directory service would be for the local node which received the update to broadcast the update information to all other nodes. In order to accomplish this broadcast, the broadcast message includes a special header which causes all of the protocol stacks to be set to a predetermined default protocol. In this manner the broadcast message can be received at all nodes.

FIG. 8 illustrates the steps involved when a client application located in a client node coordinates with the communications directory service to access a remote service. As in the server node, the client node includes a system address space 810 which, in turn, contains a copy of the communications directory service 812 and a networking service 818. The application program 800 runs in its own application address space 804 and interacts with the communications directory service 812 to get a reference to one of the service objects previously stored in the communications directory service 812 by a service program. The application program/directory service interaction is shown schematically by arrow 806.

A reference to the service object identified by the communications directory service 812 is returned to the application program 800 as shown schematically by arrow 808. The application program, in turn, creates a client interface object 826 in preparation for sending the configuration data to the network service 818. The service object reference is passed by the communications directory service 812, via a configuration data stream 814, to the client interface 826. From the client interface 826, the configuration data is streamed over configuration data stream 816 to a server interface object 820 located in the networking service 818. The service interface object 820 is created when the networking service 818 is created during system boot up and is permanently resident in the networking service.

The application program 800 then activates the service object reference causing the stack definitions contained in the service object to be transferred to the networking service 818 in order to set up protocol stack layers for configuring the DRPS 824 in preparation for sending request and reply data between the application program 800 and the remote service (shown in FIG. 7). During the configuration process, the address of the session layer 823 in the DRPS 824 is returned to the server interface 820. The server interface 820 exchanges the address of the session layer 823 for the remote service exchange obtained from the service object reference and returns the remote service exchange, via configuration data stream 816, client interface 826 and data path 802 to the application program 800. Thus, when the application program communicates with the remote service, it uses the remote service address passed through the communications directory service to the networking service.

In addition, during the activation process, a separate data path is set up to send service requests from application program 800 to the remote service. In order to create this separate data path, the application program 800 instantiates a caller object 832. The caller object contains protocol functions which have been previously-agreed upon for communicating with a dispatcher object (such as dispatcher object 730 in FIG. 7) in a remote server node.

The aforementioned separate data path comprises data path 802, client interface 826, caller object 832, and the session layer 823 of the DRPS 824. The request information is then sent out over physical communication link 830 to the remote service location. Reply information returns via DRPS 824, data stream 828, caller object 832, client interface 826 and data path 802 to the application program 800.

Figure 9:
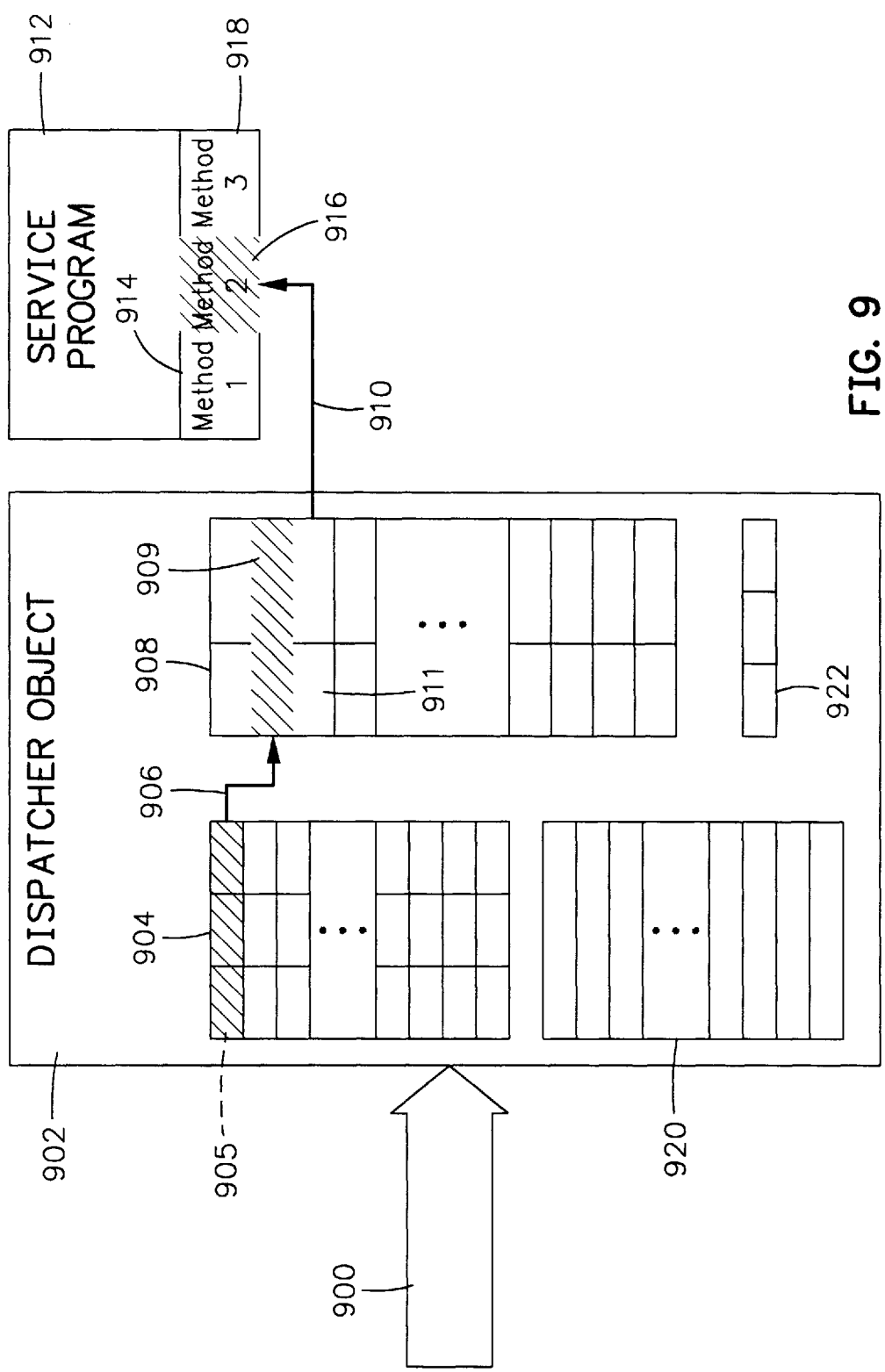
FIG. 9 is a schematic block diagram illustrating the major components of a dispatcher object used in conjunction with a service program.

The composition of the dispatcher object 730 (FIG. 7) is shown in more detail in FIG. 9 which illustrates the main components of the dispatcher object 902. These components comprise a dictionary table 904, a request table 908, a child directory table 920 and a dictionary cache location 922.

The request table 908 is a multi-entry table which comprises a list of function pointers that identify methods in the various service programs, which methods (also called "requests" in the description below) are used to satisfy incoming service requests. The request table 908 is necessary because, in most cases, a service object created in the client node does not contain the entry point address of the actual function which is used to satisfy a particular request. As will be hereinafter explained, each service program in the server node registers its methods in the request table 908 when the service is activated (activation has been previously explained). In this manner, the request table 908 can be used to locate an appropriate function address when a service request is received. In FIG. 9, each table entry is represented by a horizontal line and is comprised of two components. One component is a request number and the second component is an associated remote function pointer. The function pointer, in turn, is the entry point address of a method used to provide service in a particular service program. If a service program has several methods, the function pointers for each method are stored in sequential locations in the request table 908.

The dictionary table 904 is a mechanism by which the dispatcher object 902 associates each service program with a set of locations in the request table 908, which locations contain function pointers that can be used to access the service program methods. In particular, in FIG. 9, the dictionary table 904 comprises a plurality of table entries which are each represented by a horizontal line in the table 904. Each entry, in turn, comprises three components: the first component is a class name of the service object which contains the service program. The service class name may be comprised of text characters or may be compressed in a conventional manner, for example, by a hashing technique. The second component of each table entry is a table offset number used to locate the start of a set of entries which correspond to a given service class and the third component of each table entry is a maximum request offset for a set of request entries associated with a given service class, which maximum offset is used to check whether a request table index calculated from the offset number is within the set of requests for the service class.

The dictionary table 904 is shared between service programs resident on the server node and, accordingly, access to the table must be controlled to prevent a concurrent access problem. In the illustrative embodiment , access to the dictionary table in controlled by a semaphore mechanism. In particular, in accordance with conventional semaphore operation, when the dispatcher object wishes to add an entry in the dictionary table or to find an existing entry in the dictionary table, it must first "acquire" the semaphore. After the semaphore is acquired, it is "held" during the addition or find operation until the operation is completed, at which time the semaphore is released. The semaphore allows a plurality of service programs to utilize a single dictionary table without concurrent access problems.

In the preferred embodiment, a dictionary cache location 922 is used to increase the speed of a dispatch operation by eliminating the dictionary lookup which is normally required to obtain the request table offset. In particular, each time a dictionary entry is requested and found, the three components of that table entry are temporarily stored in cache location 922. The hashed class name of the next incoming request is compared to the hashed class number stored in this cache location. If there is a match, the dictionary contents correspond to the incoming request and the request table offset can be directly obtained from the cache location. In many cases, the use of the cache location eliminates a dictionary lookup that would otherwise be required along with the required operation of acquiring and releasing the semaphore.

The general operation of the dispatcher object 902 begins when the class name of an incoming service request represented by arrow 900 is first compared to the class name stored in cache location 922 to see whether the incoming request is the same as the immediately proceeding request. If so, the request table offset stored in the cache memory is obtained. If not, the class name of the incoming request is used to retrieve the contents of an entry in the dictionary table 904. These latter contents are used to index into the request table 908 as indicated schematically in FIG. 9 by arrow 906. The request table entry (909) which is indexed by the dictionary table entry is the first request in a set of requests for a particular service program (for example, program 912). Thus, request table entry 909 corresponds to Method 1 (914) of service program 912.

The request number which part of the incoming request is used to locate the method which will actually be used to satisfy the request (for example, entry 911) and the function pointer in this entry is used to call one of the functions (Method 2, 916) in the selected service program 912 as shown schematically as arrow 910. The next succeeding request table entry corresponds to Method 3, 918.

Also included, in the dispatcher object 902 is a child directory table 920. As will hereinafter be explained in detail, this latter table is used when an incoming request specifies that a child dispatcher object is to be used to satisfy the request. The child directory table 920 contains the locations of the various children associated with the "parent" dispatcher object 902.

FIG. 10 indicates, in more detail, the configuration of a dictionary table 1000. Table 1000 is a conventional key-value dictionary structure. The construction and operation of such a storage structure is well-known ands will not be described in detail herein. In particular, each entry in table 1000 is represented by a horizontal row in FIG. 10 and each horizontal row is, in turn, divided into three separate table components. The first table component is the hashed class name, for example, Hashed Class Name 1 represented by block 1002. The hashed class name is the "key" value associated with each dictionary entry. Associated with the Hashed Class Name is a Request Table Offset 1 indicated by block 1008. As previously mentioned, the Request Table Offset is the request table entry number (starting from the beginning of the table) at which the information relating to the first request of a set of requests associated with the selected service program is stored. The last part of each dictionary table entry comprises a maximum request count (for example, Maximum Request Count 1 illustrated by block 1014). This latter number is the total number of requests associated with the selected service program. This latter value is used to check whether computations used to compute the request table index are correct. For example, the Maximum request count is used to compute a maximum request table offset. The computed request table index is then compared against the maximum request table offset, and, if the maximum table offset is exceeded, an exception is returned indicating that an error in the table index calculations has occurred. The request table offset and the maximum request count comprise the "value" portion of each dictionary entry.

In a similar manner, each other dictionary table entry comprises three components. For example, the second table entry comprises components 1004, 1010 and 1016 and, similarly, the third entry comprises components 1006, 1012 and 1018.

FIG. 11 depicts in more detail the composition of a request table 1100. In FIG. 11, each request table entry is represented by a horizontal line, and, in turn, each entry has two components: an enumeration component and the remote function pointer component. For example, entry 1 consists of the enumeration component 01 represented by block 1102 and the remote function pointer represented by block 1108. The enumeration component is used to indicate the function number for each of the functions associated with a selected service program. For example, the request table fragment shown in FIG. 11 represents the requests for two service programs. The first service program has two functions represented by request table entries consisting of enumeration block 1102 and corresponding remote function pointer 1108 and enumeration block 1104 and corresponding remote function pointer 1110. The second service program has a single function represented by enumeration block 1106 and remote function pointer 1112.

There are many ways to implement the request table 1100. For example, one table may be used for all address spaces. In this latter case the table must be shared with some mechanism to prevent concurrent access problems such as the semaphore mechanism discussed previously with respect to the dictionary table access. Concurrent access problems are prevented since each incoming request requires that the semaphore be obtained before performing a look up in the table. However, there is significant overhead associated with the use of the semaphore and consequently, request processing speed is considerably reduced.

In accordance with a preferred embodiment, a single table is used, but a semaphore mechanism is not required because the table is configured so that it will never grow or move. In particular, a large number of request table entries are associated with the table such that the table will never become filled during normal use. However, the table is composed of "virtual" entries for which no memory space is physically allocated until the entries are actually used. In particular, page table space for a full request table is actually be allocated in each address space. The tables are managed in each address space via a copy-on-write operation so that only those pages which are actually written are copied out to each address space and allocated.

In order to ensure that the request table does not move, space for a page table in each address space is allocated initially, where the space occupied by the request table in each address space can be computed by using the following formula:

Table Address Space=(max no. of requests*((sizeof) pointer to member))/(current page size)

A typical maximum number of requests is 1024 requests and a pointer size of 8 bytes with a typical page size is 512 bytes results in a total request table space of 16 pages. Accordingly the page table space which is actually allocated in each address space is equal to the number of pages times 4 bytes or 64 bytes.

Figure 12A:
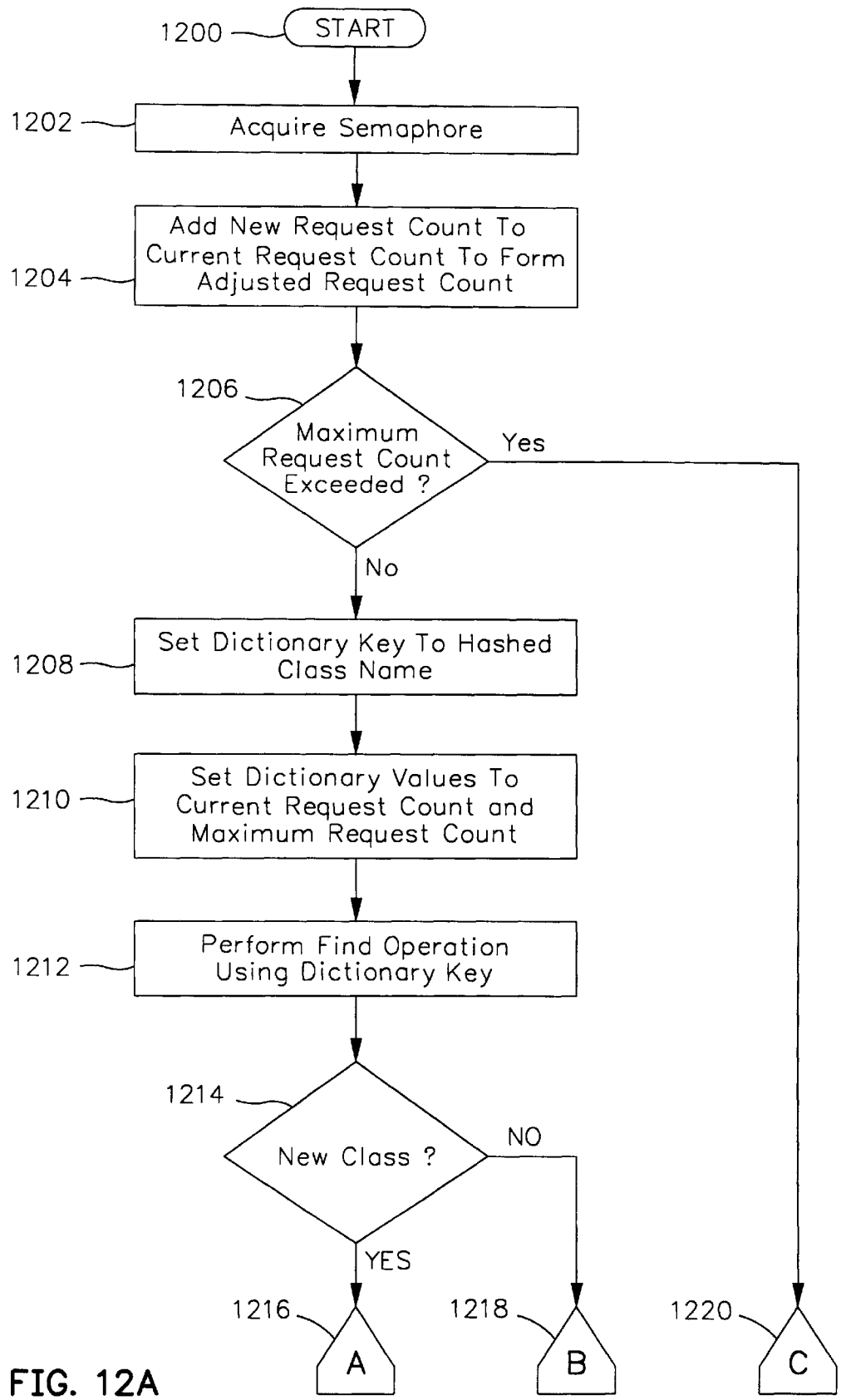
FIGS. 12A and 12B, when placed together, form a flowchart of an illustrative routine for registering requests for a new service in the dispatcher object.
Figure 12B:
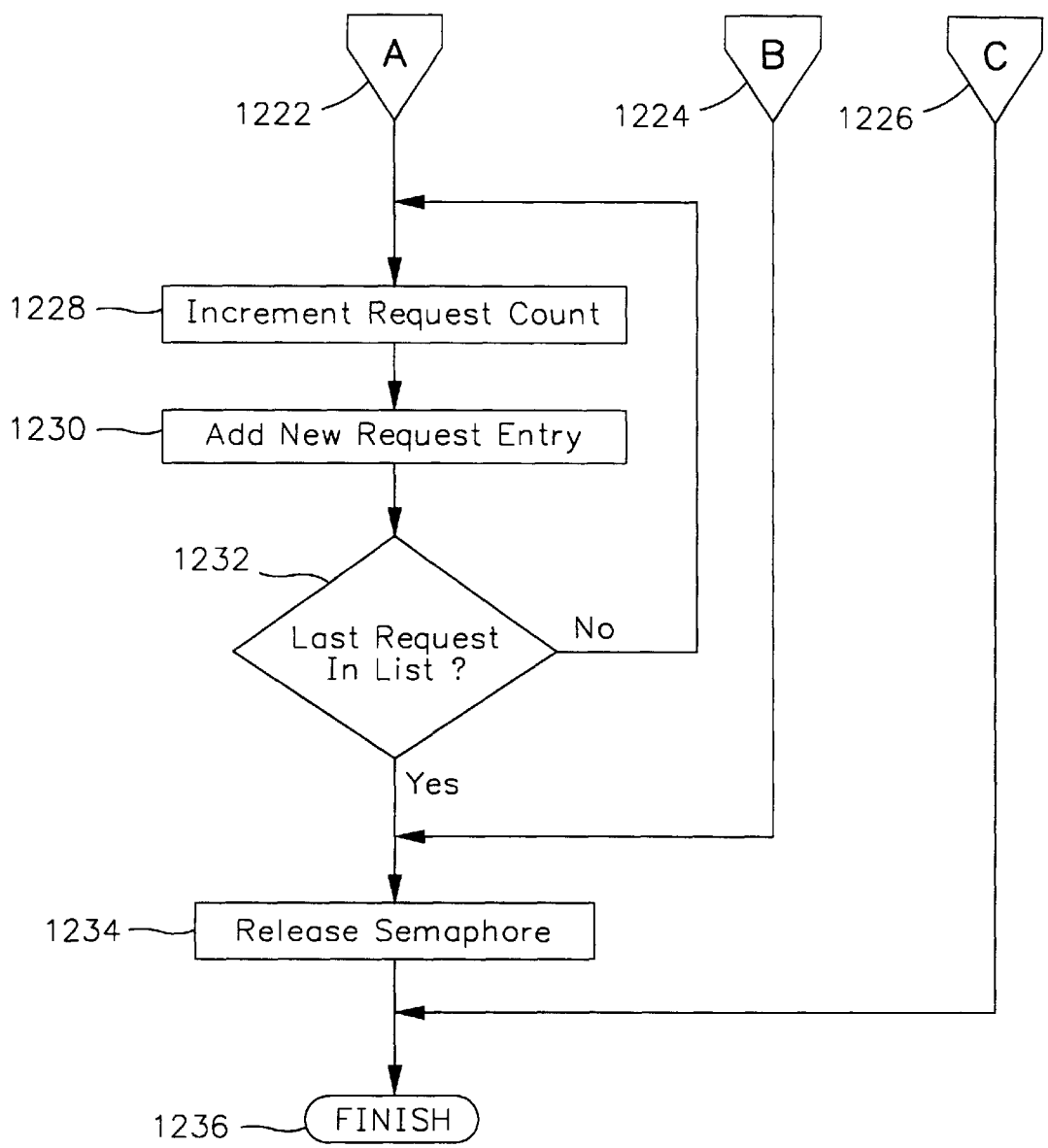

FIGS. 12A and 12B, when placed together, form a flowchart of an illustrative routine used by the dispatcher object in order to register a new service program in the dictionary table and the request table. In order to perform this registration, the service program calls the registration routine outlined in FIGS. 12A and 12B, passing to the dispatcher object a class name (hashed in the illustrative embodiment) for the class used to construct the service object, a request list of the remote function pointers for the selected service program methods and a request count indicating the total number of requests in the list.

The routine starts in step 1200 and proceeds to step 1202 where the semaphore is acquired. As previously mentioned, the dispatcher object dictionary table is shared and is thus controlled by the semaphore. Accordingly, the routine must first acquire the semaphore as indicated in step 1202 before any manipulations of the dictionary table can be commenced.

Next, in steps 1204 and 1206, a check is made to determine whether the new set of requests corresponding to the new service program will fit in the table. As previously mentioned, a large number of request entries are pre-allocated in the table so that it is unlikely that the table will ever fill during normal operation, but this preliminary check is made to insure proper operation.

In particular, the dispatcher object maintains a request count which is the current total of requests currently registered in the request table and a maximum request count which is the maximum number of requests which can be registered in the table. In step 1204, the new request count forwarded to the dispatcher object by the service program is added to the current request count to form an adjusted request count.

In step 1206, the adjusted request count is compared to the maximum request count. If the maximum request count is exceeded, the routine then proceeds, via off-page connectors 1220 and 1226, to the finish in step 1236.

Alternatively, if in step 1206, the maximum request count is not exceeded by the adjusted request count, the new request set can be added to the table without causing an exception. In this latter case, the routine proceeds to step 1208 in which the dictionary key value is set to the hashed class name received from the service program. In step 1210 the dictionary values for the entry are set to the current request count (which indicates the position of the last table entry in which a request has been registered) and the maximum request count provided by the service program.

Next in step 1212, a "find" operation is performed on the dictionary using the hashed class name as the key value. If the class name already exists in the dictionary table, the values stored in the corresponding entry are returned. Alternatively, if the class name does not already exist in the dictionary table, then the new dictionary entry is added and a null value is returned indicating that a new class has been added to the table. The find routine is written such that existing entries are never overwritten by the new information and the new information is always appended to the end of the table.

In step 1214, the value returned by the find operation is checked to determine whether a new addition has been made to the table or whether the class already exists in the table. If the class is not new, then the routine proceeds, via off-page connectors 1218 and 1224, to step 1234 where the semaphore which has been acquired in step 1202 is released, allowing other accesses to be made to the dictionary table. The routine then finishes in step 1236.

Alternatively, if in step 1214, it is determined that a new class has been added to the dictionary table, then the request table must also be updated. To do this, the routine proceeds, via off-page connectors 1216 and 1222, to step 1228 in which the request count (indicating the number of requests presently in the table) is incremented. In step 1230, a new request entry is added to the request table. This request entry is obtained from the aforementioned request list provided by the service program to the dispatcher object during the registration procedure.

In step 1232, a check is made to determine whether the last request in list has been processed. If not, the routine proceeds to step 1228 where the request count is again incremented and a new request entry is added. The routine continues in the loop consisting of steps 1228, 1230 and 1232 until all requests in the request list provided by the service program have been added to the request table. The semaphore is then released in step 1234 and the routine finishes in step 1236.

Figure 13:
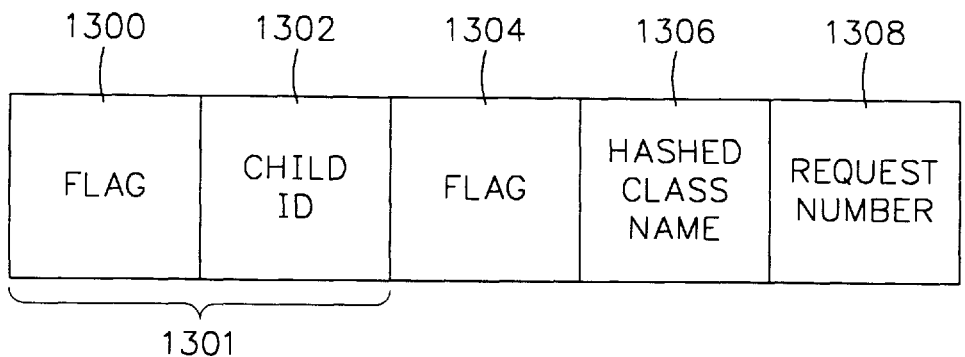
FIG. 13 is schematic block diagram illustrating the form of a request which is sent over the network to a remote server.
Figure 15:
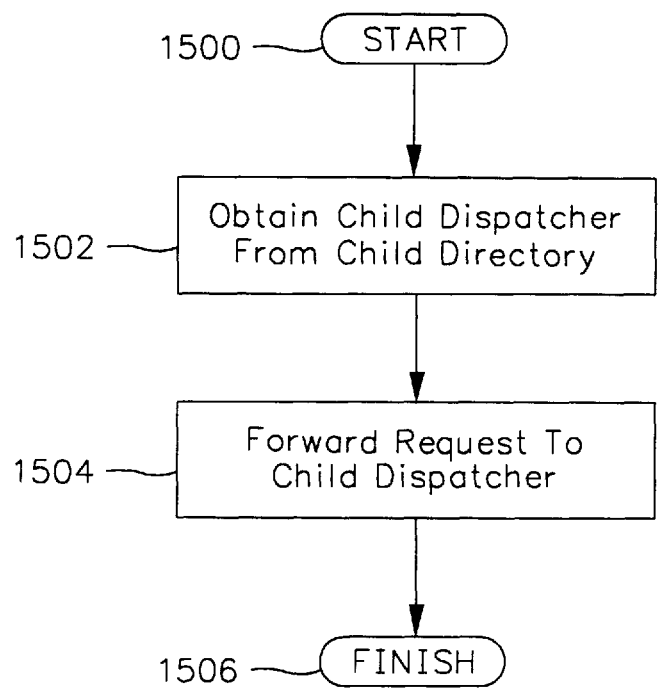
FIG. 15 is an illustrative flowchart of the sequence of steps carried out to dispatch a request to a child dispatcher object.

FIGS. 13–15 depict illustrative routines which are used to by the dispatcher object to process incoming service requests received from the caller object in the client node. During the operation of the application program in the client node, a service object is created as previously discussed. When a service request is made by calling one of the functions in the local service object, a network connection is set up using the communications directory service to locate the correct server and the service program address as previously described. A caller object is created in preparation for the service requests and, in response to a service request placed to the local service object, the caller object forwards a service request data packet to the remote server. The incoming service request data packet is processed by the dispatcher object in the remote server. This processing may involve executing a method in a service program located in the remote node, or the processing may involve forwarding the request data packet on to a child dispatcher object located in another node.

FIG. 13 illustrates the configuration of an exemplary service request data packet. The service request packet may be forwarded from the caller object with or without an initial child ID field which, in turn, indicates that the request is to be forwarded on to another dispatcher object. In FIG. 13, the request packet is shown with an initial child ID preamble 1301, however, the preamble may be omitted if the request is to be serviced in the parent dispatcher object.

The request data packet begins with a flag number 1300 which indicates that the following data 1302 is a Child ID. Processing in a child dispatcher might be used, for example, where a font manager service program is located in the same node as the parent dispatcher object, but the font data processed by the font manager is located in other nodes. By means of the child dispatcher arrangement the font data can be retrieved from the other nodes and used by the font manager in handling the service request. Accordingly, a child ID 1202 is prepended to the service request data. During processing of the request data packet, this child ID will be "stripped off" and used to forward the remainder of the service request information to the node where the child dispatcher object is located. The remainder of the request packet is forwarded on to the other node by using the same mechanism that is used to send the request packet from the client node to the server node. In particular, the dispatcher object uses the information in the child directory in conjunction with the communications directory service to establish a network connection to the other node. The dispatcher object then creates a caller object and uses it to forward the remainder of the request information to the child dispatcher object in a manner similar to that described above for transmission of request information to the parent dispatcher object.

The child ID is, in turn, followed by an additional flag number 1204 which indicates the type of request in the data packet. In particular, there are three basic types of request: a simple request, a request with a cache return and a request with an accompanying request table index. In a simple request, the information in the request is used to locate and execute one of the methods in the selected service program. In a request with a cache return, the request table index which is calculated during the request processing (as will hereinafter be described) is returned to the caller object. The caller object, in turn, caches the request table index so that subsequent requests made to the same service program by the caller object can forward the request table index. In this manner a dictionary table lookup can be avoided. The third request includes the request table index which has been previously cached in the caller object.

FIG. 13 illustrates a simple request data packet. In this type of service request, the flag number 1304 is followed by the hashed class name 1306 and a request number 1308. This information is used to compute a request table index that is, in turn, used to select the request table entry containing the function pointer that will be used to satisfy the incoming request.

Figure 14A:
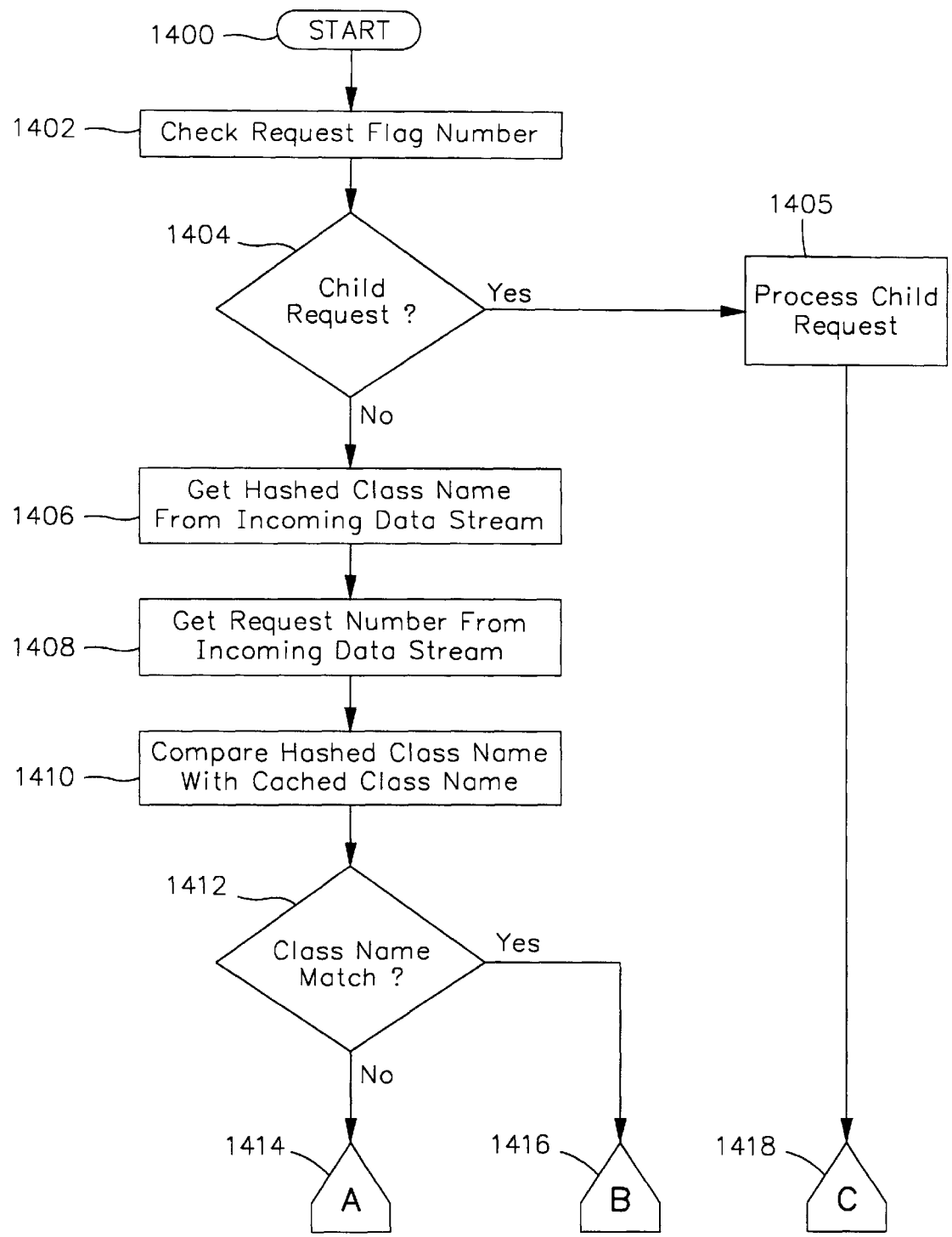
FIGS. 14A and 14B, when placed together, form a flowchart of an illustrative routine for dispatching incoming requests to the proper function in a service program.
Figure 14B:
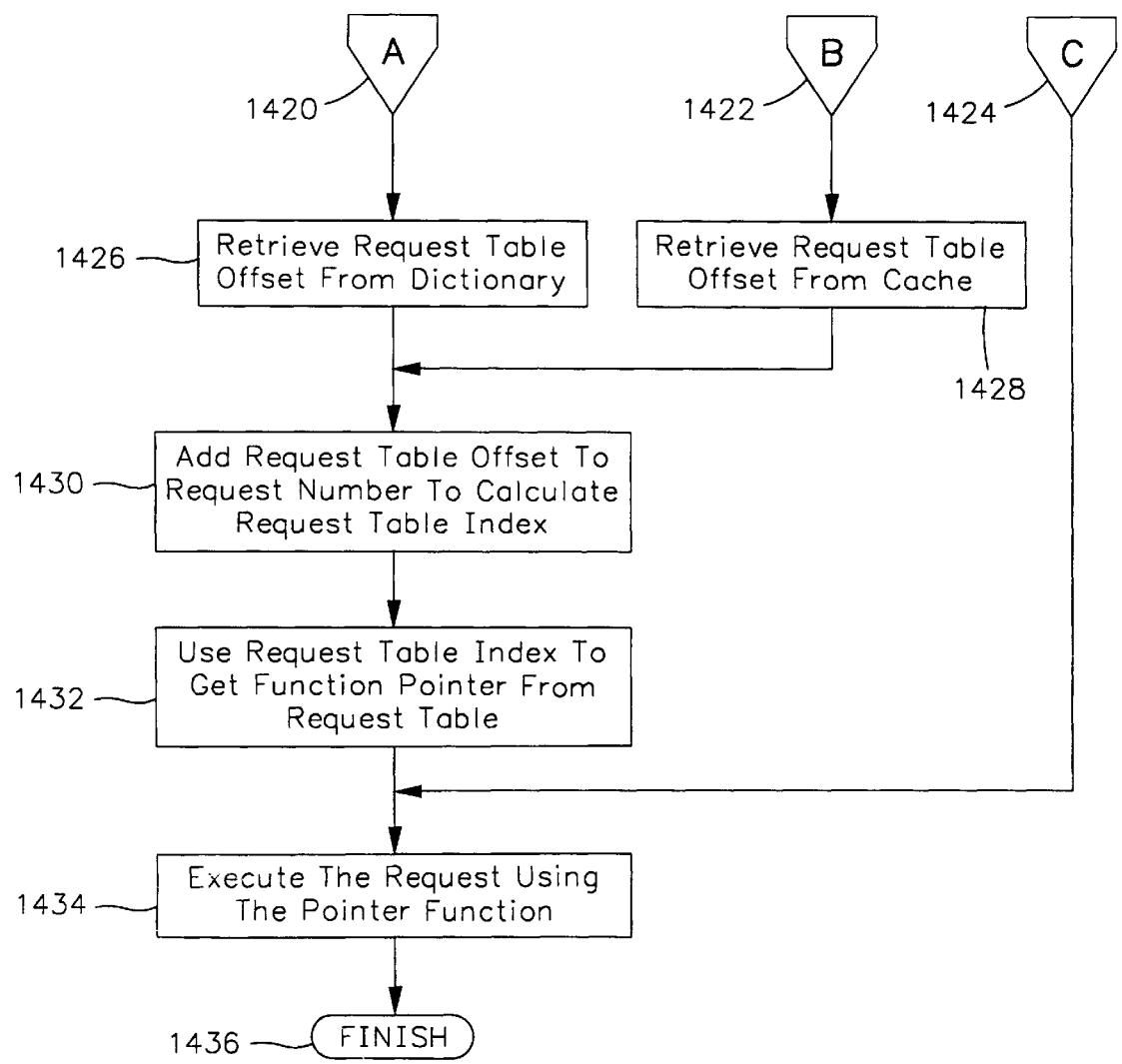

FIGS. 14A and 14B, when placed together, form a flowchart of an illustrative routine used to dispatch an incoming service request to a method in a service program. The routine starts in step 1400 and proceeds to step 1402 where the data packet is examined to determine whether the request has a prepended flag and child ID. This check is performed by checking the initial portion of the data packet to determine if it is a child ID flag. A decision is made in step 1404 whether a child request is present. If so, in step 1405, the child request is processed as will be described in detail in connection with FIG. 15. After the child request has been processed, the routine proceeds, via off-page connectors 1418 and 1424, to finish in step 1436.

Alternatively, if in step 1404 a child request is not present, then, the hashed class name is obtained from the incoming data stream in step 1406 and, in step 1408, the request number is obtained from the incoming data stream.

In step 1410, the hashed class name obtained from the incoming data stream is compared with the hashed class name stored in the dictionary cache. If the numbers match as determined in step 1412, then the incoming service request is the same as the last service request. in this case, the routine proceeds, via off-page connectors 1416 and 1422 to retrieve the request table offset from the dictionary cache. In this manner, a dictionary lookup (which involves the acquisition and release of the semaphore) can be avoided.

Alternatively, if, in step 1412, the hashed class name retrieved from the incoming data stream does not match the cached name, then the routine proceeds, via off-page connectors 1414 and 1420, to step 1426 where the request table offset is retrieved from the dictionary table in a manner previously described.

In either case the routine proceeds to step 1430 where a request table index is computed by adding the request number obtained from the incoming data stream to the request table offset. Preferably some sanity checks are also performed at this time to make sure that the calculated request table index does not exceed the maximum number of entries in the table, etc.

The routine then proceeds to step 1432 where the calculated request table index is used to retrieve the appropriate function pointer from the request table. In step 1434, the selected method is executed using the pointer retrieved from the request table and the routine finishes in step 1436.

FIG. 15 is a more detailed flow chart of an illustrative routine used to process a child request (the child request processing is indicated in step 1405 in the parent request data processing routine). In particular, during this routine, the child ID which is indicated by the initial flag number 1300 (FIG. 13) is "stripped off" and the remainder of the request is forwarded to the appropriate child dispatcher object located in another node. When the request data reaches the selected child dispatcher object, it is processed in the same manner (shown in FIGS. 14A and 14B) as the parent dispatcher object processes the request data.

In particular, the child processing routine starts in step 1500 and proceeds to step 1502 where the child directory located in the parent dispatcher object is interrogated to obtain the address of the child dispatcher. In step 1504, the remainder of the request is forwarded to the child dispatcher object for processing. In accordance with the normal request operation, data will be retrieved or another method executed at the node in which the child dispatcher object is located and the return value or the data is forwarded back to the parent dispatcher object for further processing. The routine then finishes in step 1506.

The foregoing description has been limited to a specific embodiment of this invention. It will be apparent, however, that variations and modifications may be made to the invention, with the attainment of some or all of its advantages. For example, the present description has been concerned with the servicing of a request generated at the local service object. It would be obvious to those skilled in the art that the same mechanism could also be used to retrieve data referenced in the local service object, but actually stored in a remote node. Therefore, it is the object of the appended claims to cover all such variations and modifications as come within the true spirit and scope of the invention.

What is claimed is:

1. A distributed object system for use with a computer network having a client node and a server node connected thereto, the system implementing a first method and first data in a service object instantiated in the client node by means of a second method and second data in a service object instantiated in the server node, the system comprising:

location apparatus, responsive to an instantiation of the service object in the client node, for locating the service object instantiated in the server node and comprising a communications directory service which is responsive to a call to the first method for returning a first service object containing service class information and the network address of the server node;

establishment apparatus, responsive to the instantiation of the service object in the client node, for establishing a network connection to the server node, the establishment apparatus including apparatus for retrieving from the communications directory service information identifying the server node, a dynamically reconfigurable protocol stack, and apparatus for retrieving information from the communications directory service for configuring the dynamically reconfigurable protocol stack to establish a connection from the client node to the server node;

caller object instantiation apparatus, responsive to a call made to the method in the service object instantiated in the client node, for instantiating a caller object in the client node;

service request generation apparatus, responsive to the instantiation of the caller object, for generating a service request data packet comprising service class information and the first data and for transmitting the service request data packet over the network connection; and a dispatcher object in the server node, the dispatcher object being responsive to the service class information in the service request data packet, for locating and calling the method in the service object instantiated in the server node to generate a result and for transmitting the result over the network connection to the client node, the dispatcher object comprising:

a request table having stored therein a plurality of function pointer entries, each of the function pointer entries for identifying at least one subroutine in one of a plurality of service programs stored in the server node; and a dictionary table having a plurality of dictionary table entries, each of the dictionary table entries for associating service class information with one of the plurality of function pointer entries in the request table.

2. A distributed object system as recited in claim 1 wherein the one of the plurality of entries in the request table includes an entry point address for the second method.

3. A distributed object system as recited in claim 2 wherein each of the dictionary table entries comprises a key portion comprising a service class name and a request table offset.

4. A distributed object system as recited in claim 3 further comprising means, responsive to the request table offset and to the service class name, for calculating a request table index.

5. A distributed object system as recited in claim 4 wherein the dispatcher object further comprises:

means for maintaining a request count corresponding to a total number of requests registered in the request table; and means for maintaining a maximum request count corresponding to a maximum number of requests which can be registered in the request table and a dictionary cache location for temporarily storing the key portion and the request table index.

6. A distributed object system as recited in claim 5 wherein the dispatcher object further comprises comparison apparatus for comparing a service class identifier in the incoming service request data packet to the key portion stored in the dictionary cache location and the dispatcher object further comprises:

index means for indexing the request table using the request table index stored in the dictionary cache location when the service class identifier in the service request data packet matches the key portion stored in the dictionary cache location.

7. A distributed object system as recited in claim 6 wherein a portion of the second method is located on a node other than the client node and the server node and the dispatcher object comprises a child dispatcher object located on the other node, the child dispatcher object being responsive to a portion of the service class information in the service request data packet for calling the portion of the second method located in the other node.

8. A distributed object system as recited in claim 7 wherein the service class information in the service request data packet comprises:

a child identification portion which identifies a node other than the client node and the server node on which at least the portion of the second method is located; and a request portion which identifies a service class of the second method portion.

9. A distributed object system as recited in claim 8 wherein the dispatcher object further comprises addition apparatus controlled by the second service object in the server node for adding an entry point address of the second method into the request table.

10. A distributed object system as recited in claim 9 wherein the dictionary table has a key-value dictionary structure.

11. A system for use with a computer network having a client node and a server node connected thereto, the system comprising:

a caller, stored in a memory of the client node and accepting a service request from a client application executing in the client node and for providing a service request data packet including an identifier for computing a request table index, the identifier of the service request data packet including at least one of:

a flag number;

a child identification code; and a class name;

a first network adapter, coupled to the client node and to a communication channel, the first network adapter for receiving the service request data packet from the caller and for transmitting the service request data packet over the communication channel from the client node to the server node;

a second network adapter, coupled to the server node and the communication channel, the second network adapter for receiving the service request data packet from the first network adapter;

a dispatcher stored in a memory of the server node and coupled to the second network adapter, the dispatcher for receiving the service request packet from the second network adapter and for processing the service request data packet, the dispatcher comprising;

a request table having stored therein a plurality of function pointer entries, each of the function pointer entries for identifying at least one method in one of a plurality of service programs, each of the plurality of function pointer entries including a remote function pointer wherein the remote function pointer identifies an entry point address of a method used to provide a service in a particular service program and wherein the function pointer can be used to access the service program methods, and when a service program has a plurality of methods, the request table has stored in sequential locations thereof, a plurality of function pointers for each of a plurality of methods in the service programs wherein each of the plurality of function pointer entries includes an entry point address for each of the plurality of methods and the system further comprises means for registering in the request table each method of each service program in the server node in response to the service being activated;

a dictionary table having a plurality of dictionary table entries, each of the dictionary table entries for associating a service program with an entry in the request table and each of the dictionary table entries including:

a class name of a service object which contains a service program, wherein the class name is comprised of one of: (a) text characters; and (b) a compressed code provided by a hashing technique;

a table offset value used to locate a first one of a set of request table entries which correspond to a given service class; and a maximum request offset value for a set of request table entries associated with a particular service class, the maximum request offset value for checking whether a request table index calculated from the table offset value is within the set of request table entries for the particular service class and the dictionary table is shared between a plurality of service programs resident on the server node;

a child directory table having a plurality of entries, each of the entries corresponding to a location of a child dispatcher to be used when an incoming request specifies that a child dispatcher is to be used to satisfy the request;

a dictionary cache for storing a class name, a table offset value and a maximum request offset value of a dictionary table entry each time one of the plurality of dictionary table entries is requested and found in the dictionary table;

means for comparing an identifier of an incoming service request data packet to an entry stored in a location of the dictionary cache; and means for obtaining the incoming service request and the request table offset directly from the dictionary cache in response to the identifier of the incoming service request data packet matching the entry stored in the location of the dictionary cache; and a semaphore mechanism for controlling access to the dictionary table to prevent a plurality of service programs from concurrently accessing the dictionary table.

12. A system as recited in claim 11 wherein the service request data packet further includes a request number for locating a particular one of a plurality of methods in a service program.

13. A distributed object system as recited in claim 12 wherein the identifier of the incoming service request data packet used by the means for comparing is provided as a class name and the means for comparing compares the class name of the identifier in the incoming service request to class names stored in the dictionary cache.

14. A system as recited in claim 11 wherein the dispatcher object further comprises:

means for maintaining a request count corresponding to a total number of requests registered in the request table; and means for maintaining a maximum request count corresponding to a maximum number of requests which can be registered in the request table.

15. A system as recited in claim 14 wherein the dictionary table is provided having a key-value dictionary structure.

16. A system for use with a computer network having a client node and a server node connected thereto, the system comprising:

a caller, stored in a memory of the client node, the caller for accepting a service request from a client application executing in the client node and for providing a service request data packet including an identifier for computing a request table index, the identifier of the service request data packet including at least one of:

a flag number;

a child identification code; and a class name;

a first network adapter, coupled to the client node and to a communication channel, the first network adapter for receiving the service request data packet from the caller and for transmitting the service request data packet over the communication channel from the client node to the server node;

a second network adapter, coupled to the server node and the communication channel, the second network adapter for receiving the service request data packet from the first network adapter;

a dispatcher stored in a memory of the server node and coupled to the second network adapter, the dispatcher for receiving the service request packet from the second network adapter and for processing the service request data packet, the dispatcher comprising:

a request table having stored therein a plurality of function pointer entries, each of the function pointer entries for identifying at least one method in one of a plurality of service programs, each of the plurality of function pointer entries including a remote function pointer wherein the remote function pointer identifies an entry point address of a method used to provide a service in a particular service program and wherein the function pointer can be used to access the service program methods, and when a service program has a plurality of methods, the request table has stored in sequential locations thereof, a plurality of function pointers for each of a plurality of methods in the service programs wherein each of the plurality of function pointer entries includes an entry point address for each of the plurality of methods and the system further comprises means for registering in the request table each method of each service program in the server node in response to the service being activated;

a dictionary table having a plurality of dictionary table entries, each of the dictionary table entries for associating a service program with an entry in the request table and each of the dictionary table entries including:

a class name of a service object which contains a service program, wherein the class name is comprised of one of: (a) text characters; and (b) a compressed code and is provided as a hashed class name corresponding to a key value of the respective dictionary entry;

a table offset value used to locate a first one of a set of request table entries which correspond to a given service class; and a maximum request offset value for a set of request table entries associated with a particular service class, the maximum request offset value for checking whether a request table index calculated from the table offset value is within the set of request table entries for the particular service class;

a child directory table having a plurality of entries, each of the entries corresponding to a location of a child dispatcher to be used when an incoming request specifies that a child dispatcher is to be used to satisfy the request;

a dictionary cache for storing a class name, a table offset value and a maximum request offset value of a dictionary table entry each time one of the plurality of dictionary table entries is requested and found in the dictionary table;

means for comparing an identifier of an incoming service request data packet to an entry stored in a location of the dictionary cache; and means for obtaining the incoming service request and the request table offset directly from the dictionary cache in response to the identifier of the incoming service request data packet matching the entry stored in the location of the dictionary cache.

\* \* \* \* \*